(12) United States Patent
Pervan

(10) Patent No.: US 10,138,636 B2
(45) Date of Patent: Nov. 27, 2018

(54) MECHANICAL LOCKING SYSTEM FOR FLOOR PANELS

(71) Applicant: VÄLINGE INNOVATION AB, Viken (SE)

(72) Inventor: Darko Pervan, Viken (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 14/951,976

(22) Filed: Nov. 25, 2015

(65) Prior Publication Data

US 2016/0153200 A1    Jun. 2, 2016

(30) Foreign Application Priority Data

Nov. 27, 2014 (SE) ....................... 1451438

(51) Int. Cl.
| | | |
|---|---|---|
| E04B 2/20 | (2006.01) | |
| E04F 15/02 | (2006.01) | |
| E04F 15/10 | (2006.01) | |
| F16B 5/00 | (2006.01) | |

(52) U.S. Cl.
CPC ...... *E04F 15/02038* (2013.01); *E04F 15/102* (2013.01); *E04F 15/107* (2013.01); *E04F 2201/0146* (2013.01); *E04F 2201/057* (2013.01); *E04F 2201/0547* (2013.01); *E04F 2201/0582* (2013.01); *E04F 2201/0588* (2013.01); *F16B 5/0088* (2013.01)

(58) Field of Classification Search
CPC ........ E04F 15/02038; E04F 2201/0547; E04F 2201/0138; E04F 2201/044; E04F 2201/0523; E04F 2201/0115
See application file for complete search history.

(56) References Cited

U.S. PATENT DOCUMENTS

| | | | |
|---|---|---|---|
| 87,853 A | 3/1869 | Kappes | |
| 108,068 A | 10/1870 | Utley | |
| 124,228 A | 3/1872 | Stuart | |
| 213,740 A | 4/1879 | Conner | |
| 274,354 A | 3/1883 | McCarthy et al. | |
| 316,176 A | 4/1885 | Ransom | |

(Continued)

FOREIGN PATENT DOCUMENTS

| | | |
|---|---|---|
| CA | 2456513 A1 | 2/2003 |
| CN | 201588375 U | 9/2010 |

(Continued)

OTHER PUBLICATIONS

U.S. Appl. No. 13/670,039, filed Nov. 6, 2012, Darko Pervan, Niclas Håkansson and Per Nygren, (Cited herein as US Patent Application Publication No. 2013/0081349 A1 of Apr. 4, 2013).

(Continued)

*Primary Examiner* — Gisele D Ford

(74) *Attorney, Agent, or Firm* — Buchanan Ingersoll & Rooney P.C.

(57) ABSTRACT

Floor panels (1, 1') are shown, which are provided with a mechanical locking system including a flexible tongue (10) in a displacement groove (11). The flexible tongue (10) may be formed from the core material (5) of the floor panels and inserted during production into the displacement groove (11). The locking system may be locked with vertical folding.

20 Claims, 16 Drawing Sheets

(56) References Cited

U.S. PATENT DOCUMENTS

| | | |
|---|---|---|
| 634,581 A | 10/1899 | Miller |
| 861,911 A | 7/1907 | Stewart |
| 1,194,636 A | 8/1916 | Joy |
| 1,723,306 A | 8/1929 | Sipe |
| 1,743,492 A | 1/1930 | Sipe |
| 1,809,393 A | 6/1931 | Rockwell |
| 1,902,716 A | 3/1933 | Newton |
| 2,026,511 A | 12/1935 | Storm |
| 2,027,292 A | 1/1936 | Rockwell |
| 2,110,728 A | 3/1938 | Hoggatt |
| 2,204,675 A | 6/1940 | Grunert |
| 2,266,464 A | 12/1941 | Kraft |
| 2,277,758 A | 3/1942 | Hawkins |
| 2,430,200 A | 11/1947 | Wilson |
| 2,596,280 A | 5/1952 | Nystrom |
| 2,732,706 A | 1/1956 | Friedman |
| 2,740,167 A | 4/1956 | Rowley |
| 2,858,584 A | 11/1958 | Gaines |
| 2,863,185 A | 12/1958 | Riedi |
| 2,865,058 A | 12/1958 | Andersson |
| 2,889,016 A | 6/1959 | Warren |
| 3,023,681 A | 3/1962 | Worson |
| 3,077,703 A | 2/1963 | Bergstrom |
| 3,099,110 A | 7/1963 | Spaight |
| 3,147,522 A | 9/1964 | Schumm |
| 3,187,612 A | 6/1965 | Hervey |
| 3,271,787 A | 9/1966 | Clary |
| 3,325,585 A | 6/1967 | Brenneman |
| 3,331,180 A | 7/1967 | Vissing et al. |
| 3,378,958 A | 4/1968 | Parks et al. |
| 3,396,640 A | 8/1968 | Fujihara |
| 3,512,324 A | 5/1970 | Reed |
| 3,517,927 A | 6/1970 | Kennel |
| 3,526,071 A | 9/1970 | Watanabe |
| 3,535,844 A | 10/1970 | Glaros |
| 3,572,224 A | 3/1971 | Perry |
| 3,579,941 A | 5/1971 | Tibbals |
| 3,720,027 A | 3/1973 | Christensen |
| 3,722,379 A | 3/1973 | Koester |
| 3,731,445 A | 5/1973 | Hoffmann et al. |
| 3,742,669 A | 7/1973 | Mansfeld |
| 3,760,547 A | 9/1973 | Brenneman |
| 3,760,548 A | 9/1973 | Sauer et al. |
| 3,778,954 A | 12/1973 | Meserole |
| 3,849,235 A | 11/1974 | Gwynne |
| 3,919,820 A | 11/1975 | Green |
| 3,950,915 A | 4/1976 | Cole |
| 3,994,609 A | 11/1976 | Puccio |
| 4,007,767 A | 2/1977 | Colledge |
| 4,007,994 A | 2/1977 | Brown |
| 4,030,852 A | 6/1977 | Hein |
| 4,037,377 A | 7/1977 | Howell et al. |
| 4,041,665 A | 8/1977 | de Munck |
| 4,064,571 A | 12/1977 | Phipps |
| 4,080,086 A | 3/1978 | Watson |
| 4,082,129 A | 4/1978 | Morelock |
| 4,100,710 A | 7/1978 | Kowallik |
| 4,104,840 A | 8/1978 | Heintz et al. |
| 4,107,892 A | 8/1978 | Bellem |
| 4,113,399 A | 9/1978 | Hansen, Sr. et al. |
| 4,169,688 A | 10/1979 | Toshio |
| RE30,154 E | 11/1979 | Jarvis |
| 4,196,554 A | 4/1980 | Anderson |
| 4,227,430 A | 10/1980 | Janssen et al. |
| 4,299,070 A | 11/1981 | Oltmanns |
| 4,304,083 A | 12/1981 | Anderson |
| 4,426,820 A | 1/1984 | Terbrack |
| 4,447,172 A | 5/1984 | Galbreath |
| 4,512,131 A | 4/1985 | Laramore |
| 4,599,841 A | 7/1986 | Haid |
| 4,648,165 A | 3/1987 | Whitehorne |
| 4,819,932 A | 4/1989 | Trotter, Jr. |
| 5,007,222 A | 4/1991 | Raymond |
| 5,026,112 A | 6/1991 | Rice |
| 5,071,282 A | 12/1991 | Brown |
| 5,135,597 A | 8/1992 | Barker |
| 5,148,850 A | 9/1992 | Urbanick |
| 5,173,012 A | 12/1992 | Ortwein et al. |
| 5,182,892 A | 2/1993 | Chase |
| 5,247,773 A | 9/1993 | Weir |
| 5,272,850 A | 12/1993 | Mysliwiec et al. |
| 5,274,979 A | 1/1994 | Tsai |
| 5,295,341 A | 3/1994 | Kajiwara |
| 5,344,700 A | 9/1994 | McGath et al. |
| 5,348,778 A | 9/1994 | Knipp et al. |
| 5,373,674 A | 12/1994 | Winter, IV |
| 5,465,546 A | 11/1995 | Buse |
| 5,485,702 A | 1/1996 | Sholton |
| 5,502,939 A | 4/1996 | Zadok et al. |
| 5,548,937 A | 8/1996 | Shimonohara |
| 5,577,357 A | 11/1996 | Civelli |
| 5,598,682 A | 2/1997 | Haughian |
| 5,618,602 A | 4/1997 | Nelson |
| 5,634,309 A | 6/1997 | Polen |
| 5,658,086 A | 8/1997 | Brokaw et al. |
| 5,694,730 A | 12/1997 | Del Rincon et al. |
| 5,755,068 A | 5/1998 | Ormiston |
| 5,860,267 A | 1/1999 | Pervan |
| 5,899,038 A | 5/1999 | Stroppiana |
| 5,910,084 A | 6/1999 | Koike |
| 5,950,389 A | 9/1999 | Porter |
| 5,970,675 A | 10/1999 | Schray |
| 6,006,486 A | 12/1999 | Moriau |
| 6,029,416 A | 2/2000 | Andersson |
| 6,052,960 A | 4/2000 | Yonemura |
| 6,065,262 A | 5/2000 | Motta |
| 6,173,548 B1 | 1/2001 | Hamar et al. |
| 6,182,410 B1 | 2/2001 | Pervan |
| 6,203,653 B1 | 3/2001 | Seidner |
| 6,210,512 B1 | 4/2001 | Jones |
| 6,254,301 B1 | 7/2001 | Hatch |
| 6,295,779 B1 | 10/2001 | Canfield |
| 6,314,701 B1 | 11/2001 | Meyerson |
| 6,332,733 B1 | 12/2001 | Hamberger |
| 6,339,908 B1 | 1/2002 | Chuang |
| 6,345,481 B1 | 2/2002 | Nelson |
| 6,358,352 B1 | 3/2002 | Schmidt |
| 6,363,677 B1 | 4/2002 | Chen et al. |
| 6,385,936 B1 | 5/2002 | Schneider |
| 6,418,683 B1 | 7/2002 | Martensson et al. |
| 6,446,413 B1 | 9/2002 | Gruber |
| 6,449,918 B1 | 9/2002 | Nelson |
| 6,450,235 B1 | 9/2002 | Lee |
| 6,490,836 B1 | 12/2002 | Moriau et al. |
| 6,505,452 B1 | 1/2003 | Hannig |
| 6,546,691 B2 | 4/2003 | Leopolder |
| 6,553,724 B1 | 4/2003 | Bigler |
| 6,576,079 B1 | 6/2003 | Kai |
| 6,584,747 B2 | 7/2003 | Kettler et al. |
| 6,588,166 B2 | 7/2003 | Martensson |
| 6,591,568 B1 | 7/2003 | Pålsson |
| 6,601,359 B2 | 8/2003 | Olofsson |
| 6,617,009 B1 | 9/2003 | Chen et al. |
| 6,647,689 B2 | 11/2003 | Pletzer et al. |
| 6,647,690 B1 | 11/2003 | Martensson |
| 6,651,400 B1 | 11/2003 | Murphy |
| 6,670,019 B2 | 12/2003 | Andersson |
| 6,672,030 B2 | 1/2004 | Schulte |
| 6,681,820 B2 | 1/2004 | Olofsson |
| 6,684,592 B2 | 2/2004 | Martin |
| 6,685,391 B1 | 2/2004 | Gideon |
| 6,729,091 B1 | 5/2004 | Martensson |
| 6,763,643 B1 | 7/2004 | Martensson |
| 6,766,622 B1 | 7/2004 | Thiers |
| 6,769,219 B2 | 8/2004 | Schwitte et al. |
| 6,769,835 B2 | 8/2004 | Stridsman |
| 6,802,166 B1 | 10/2004 | Durnberger |
| 6,804,926 B1 | 10/2004 | Eisermann |
| 6,808,777 B2 | 10/2004 | Andersson et al. |
| 6,854,235 B2 | 2/2005 | Martensson |
| 6,862,857 B2 | 3/2005 | Tychsen |
| 6,865,855 B2 | 3/2005 | Knauseder |
| 6,874,291 B1 | 4/2005 | Weber |
| 6,880,307 B2 | 4/2005 | Schwitte et al. |

(56) References Cited

U.S. PATENT DOCUMENTS

| | | |
|---|---|---|
| 6,948,716 B2 | 9/2005 | Drouin |
| 7,021,019 B2 | 4/2006 | Knauseder |
| 7,040,068 B2 | 5/2006 | Moriau et al. |
| 7,051,486 B2 | 5/2006 | Pervan |
| 7,108,031 B1 | 9/2006 | Secrest |
| 7,121,058 B2 | 10/2006 | Pålsson |
| 7,152,383 B1 | 12/2006 | Wilkinson et al. |
| 7,188,456 B2 | 3/2007 | Knauseder |
| 7,219,392 B2 | 5/2007 | Mullet et al. |
| 7,251,916 B2 | 8/2007 | Konzelmann et al. |
| 7,257,926 B1 | 8/2007 | Kirby |
| 7,337,588 B1 | 3/2008 | Moebus |
| 7,377,081 B2 | 5/2008 | Ruhdorfer |
| 7,451,578 B2 | 11/2008 | Hannig |
| 7,454,875 B2 | 11/2008 | Pervan et al. |
| 7,516,588 B2 | 4/2009 | Pervan |
| 7,517,427 B2 | 4/2009 | Sjoberg et al. |
| 7,533,500 B2 | 5/2009 | Morton et al. |
| 7,556,849 B2 | 7/2009 | Thompson et al. |
| 7,568,322 B2 | 8/2009 | Pervan |
| 7,584,583 B2 | 9/2009 | Bergelin et al. |
| 7,614,197 B2 | 11/2009 | Nelson |
| 7,617,651 B2 | 11/2009 | Grafenauer |
| 7,621,092 B2 | 11/2009 | Groeke et al. |
| 7,634,884 B2 | 12/2009 | Pervan |
| 7,637,068 B2 | 12/2009 | Pervan |
| 7,644,553 B2 | 1/2010 | Knauseder |
| 7,654,055 B2 | 2/2010 | Ricker |
| 7,677,005 B2 | 3/2010 | Pervan |
| 7,716,889 B2 | 5/2010 | Pervan |
| 7,721,503 B2 | 5/2010 | Pervan et al. |
| 7,726,088 B2 | 6/2010 | Muehlebach |
| 7,757,452 B2 | 7/2010 | Pervan |
| 7,802,411 B2 | 9/2010 | Pervan |
| 7,806,624 B2 | 10/2010 | McLean et al. |
| 7,841,144 B2 | 11/2010 | Pervan et al. |
| 7,841,145 B2 | 11/2010 | Pervan et al. |
| 7,841,150 B2 | 11/2010 | Pervan |
| 7,856,789 B2 | 12/2010 | Eisermann |
| 7,861,482 B2 | 1/2011 | Pervan et al. |
| 7,866,110 B2 | 1/2011 | Pervan |
| 7,908,815 B2 | 3/2011 | Pervan et al. |
| 7,908,816 B2 | 3/2011 | Grafenauer |
| 7,930,862 B2 | 4/2011 | Bergelin et al. |
| 7,954,295 B2 | 6/2011 | Pervan |
| 7,980,039 B2 | 7/2011 | Groeke |
| 7,980,041 B2 | 7/2011 | Pervan |
| 8,006,458 B1 | 8/2011 | Olofsson et al. |
| 8,033,074 B2 | 10/2011 | Pervan |
| 8,042,311 B2 | 10/2011 | Pervan |
| 8,061,104 B2 | 11/2011 | Pervan |
| 8,079,196 B2 | 12/2011 | Pervan |
| 8,112,967 B2 | 2/2012 | Pervan et al. |
| 8,171,692 B2 | 5/2012 | Pervan |
| 8,181,416 B2 | 5/2012 | Pervan et al. |
| 8,191,334 B2 | 6/2012 | Braun |
| 8,220,217 B2 | 7/2012 | Muehlebach |
| 8,234,830 B2 | 8/2012 | Pervan et al. |
| 8,245,478 B2 | 8/2012 | Bergelin |
| 8,281,549 B2 | 10/2012 | Du |
| 8,302,367 B2 | 11/2012 | Schulte |
| 8,336,272 B2 | 12/2012 | Prager et al. |
| 8,341,914 B2 | 1/2013 | Pervan et al. |
| 8,341,915 B2 | 1/2013 | Pervan et al. |
| 8,353,140 B2 | 1/2013 | Pervan et al. |
| 8,359,805 B2 | 1/2013 | Pervan et al. |
| 8,375,673 B2 | 2/2013 | Evjen |
| 8,381,476 B2 | 2/2013 | Hannig |
| 8,381,477 B2 | 2/2013 | Pervan et al. |
| 8,387,327 B2 | 3/2013 | Pervan |
| 8,448,402 B2 | 5/2013 | Pervan et al. |
| 8,499,521 B2 | 8/2013 | Pervan et al. |
| 8,505,257 B2 | 8/2013 | Boo et al. |
| 8,511,031 B2 | 8/2013 | Bergelin et al. |
| 8,522,505 B2 | 9/2013 | Beach |
| 8,528,289 B2 | 9/2013 | Pervan et al. |
| 8,544,230 B2 | 10/2013 | Pervan |
| 8,544,234 B2 | 10/2013 | Pervan et al. |
| 8,572,922 B2 | 11/2013 | Pervan |
| 8,578,675 B2 | 11/2013 | Palsson et al. |
| 8,590,250 B2 | 11/2013 | Oh |
| 8,596,013 B2 | 12/2013 | Boo |
| 8,615,952 B2 | 12/2013 | Engström |
| 8,627,862 B2 | 1/2014 | Pervan et al. |
| 8,631,623 B2 | 1/2014 | Engström |
| 8,635,829 B2 | 1/2014 | Schulte |
| 8,640,424 B2 | 2/2014 | Pervan et al. |
| 8,650,826 B2 | 2/2014 | Pervan et al. |
| 8,677,714 B2 | 3/2014 | Pervan |
| 8,689,512 B2 | 4/2014 | Pervan |
| 8,701,368 B2 | 4/2014 | Vermeulen |
| 8,707,650 B2 | 4/2014 | Pervan |
| 8,713,886 B2 | 5/2014 | Boo et al. |
| 8,733,065 B2 | 5/2014 | Pervan |
| 8,733,410 B2 | 5/2014 | Pervan |
| 8,763,341 B2 | 7/2014 | Pervan |
| 8,769,905 B2 | 7/2014 | Pervan |
| 8,776,473 B2 | 7/2014 | Pervan et al. |
| 8,833,026 B2 | 9/2014 | Devos et al. |
| 8,844,236 B2 | 9/2014 | Pervan et al. |
| 8,857,126 B2 | 10/2014 | Pervan et al. |
| 8,869,485 B2 | 10/2014 | Pervan |
| 8,887,468 B2 | 11/2014 | Hakansson et al. |
| 8,898,988 B2 | 12/2014 | Pervan |
| 8,925,274 B2 | 1/2015 | Pervan et al. |
| 8,938,929 B2 | 1/2015 | Engström |
| 8,959,866 B2 | 2/2015 | Pervan |
| 8,973,331 B2 | 3/2015 | Boo |
| 8,991,055 B2 | 3/2015 | Cappelle |
| 8,997,423 B2 | 4/2015 | Mann |
| 9,027,306 B2 | 5/2015 | Pervan |
| 9,051,738 B2 | 6/2015 | Pervan et al. |
| 9,068,360 B2 | 6/2015 | Pervan |
| 9,080,329 B2 | 7/2015 | Döhring |
| 9,091,077 B2 | 7/2015 | Boo |
| 9,181,697 B2 | 11/2015 | Masanek, Jr. et al. |
| 9,194,134 B2 | 11/2015 | Nygren et al. |
| 9,206,611 B2 | 12/2015 | Vermeulen et al. |
| 9,212,492 B2 | 12/2015 | Pervan et al. |
| 9,216,541 B2 | 12/2015 | Boo et al. |
| 9,238,917 B2 | 1/2016 | Pervan et al. |
| 9,284,737 B2 | 3/2016 | Pervan et al. |
| 9,290,948 B2 | 3/2016 | Cappelle |
| 9,309,679 B2 | 4/2016 | Pervan et al. |
| 9,316,002 B2 | 4/2016 | Boo |
| 9,340,974 B2 | 5/2016 | Pervan et al. |
| 9,347,469 B2 | 5/2016 | Pervan |
| 9,359,774 B2 | 6/2016 | Pervan |
| 9,366,036 B2 | 6/2016 | Pervan |
| 9,371,654 B2 | 6/2016 | Cappelle |
| 9,376,821 B2 | 6/2016 | Pervan et al. |
| 9,382,716 B2 | 7/2016 | Pervan et al. |
| 9,388,584 B2 | 7/2016 | Pervan et al. |
| 9,428,919 B2 | 8/2016 | Pervan et al. |
| 9,453,347 B2 | 9/2016 | Pervan et al. |
| 9,458,634 B2 | 10/2016 | Derelov |
| 9,482,012 B2 | 11/2016 | Nygren et al. |
| 9,540,826 B2 | 1/2017 | Pervan et al. |
| 9,663,940 B2 | 5/2017 | Boo |
| 9,725,912 B2 | 8/2017 | Pervan |
| 9,771,723 B2 | 9/2017 | Pervan |
| 9,777,487 B2 | 10/2017 | Pervan et al. |
| 9,803,374 B2 | 10/2017 | Pervan |
| 9,803,375 B2 | 10/2017 | Pervan |
| 9,856,656 B2 | 1/2018 | Pervan |
| 9,874,027 B2 | 1/2018 | Pervan |
| 2001/0024707 A1 | 9/2001 | Andersson et al. |
| 2001/0045150 A1 | 11/2001 | Owens |
| 2002/0031646 A1 | 3/2002 | Chen et al. |
| 2002/0069611 A1 | 6/2002 | Leopolder |
| 2002/0092263 A1 | 7/2002 | Schulte |
| 2002/0095894 A1 | 7/2002 | Pervan |
| 2002/0108343 A1 | 8/2002 | Knauseder |
| 2002/0170258 A1 | 11/2002 | Schwitte et al. |

(56) References Cited

U.S. PATENT DOCUMENTS

| | | |
|---|---|---|
| 2002/0170259 A1 | 11/2002 | Ferris |
| 2002/0178674 A1 | 12/2002 | Pervan |
| 2002/0178680 A1 | 12/2002 | Martensson |
| 2002/0189190 A1 | 12/2002 | Charmat et al. |
| 2002/0194807 A1 | 12/2002 | Nelson et al. |
| 2003/0009971 A1 | 1/2003 | Palmberg |
| 2003/0024199 A1 | 2/2003 | Pervan et al. |
| 2003/0037504 A1 | 2/2003 | Schwitte et al. |
| 2003/0084636 A1 | 5/2003 | Pervan |
| 2003/0094230 A1 | 5/2003 | Sjoberg |
| 2003/0101674 A1 | 6/2003 | Pervan |
| 2003/0101681 A1 | 6/2003 | Tychsen |
| 2003/0145549 A1 | 8/2003 | Palsson et al. |
| 2003/0180091 A1 | 9/2003 | Stridsman |
| 2003/0188504 A1 | 10/2003 | Ralf |
| 2003/0196405 A1 | 10/2003 | Pervan |
| 2004/0016196 A1 | 1/2004 | Pervan |
| 2004/0031227 A1 | 2/2004 | Knauseder |
| 2004/0049999 A1 | 3/2004 | Krieger |
| 2004/0060255 A1 | 4/2004 | Knauseder |
| 2004/0068954 A1 | 4/2004 | Martensson |
| 2004/0123548 A1 | 7/2004 | Gimpel et al. |
| 2004/0128934 A1 | 7/2004 | Hecht |
| 2004/0139676 A1 | 7/2004 | Knauseder |
| 2004/0139678 A1 | 7/2004 | Pervan |
| 2004/0159066 A1 | 8/2004 | Thiers et al. |
| 2004/0168392 A1 | 9/2004 | Konzelmann et al. |
| 2004/0177584 A1 | 9/2004 | Pervan |
| 2004/0182033 A1 | 9/2004 | Wernersson |
| 2004/0182036 A1 | 9/2004 | Sjoberg et al. |
| 2004/0200175 A1 | 10/2004 | Weber |
| 2004/0211143 A1 | 10/2004 | Hannig |
| 2004/0244325 A1 | 12/2004 | Nelson |
| 2004/0250492 A1 | 12/2004 | Becker |
| 2004/0261348 A1 | 12/2004 | Vulin |
| 2005/0003132 A1 | 1/2005 | Blix et al. |
| 2005/0028474 A1 | 2/2005 | Kim |
| 2005/0050827 A1 | 3/2005 | Schitter |
| 2005/0160694 A1 | 7/2005 | Pervan |
| 2005/0166514 A1 | 8/2005 | Pervan |
| 2005/0205161 A1 | 9/2005 | Lewark |
| 2005/0210810 A1 | 9/2005 | Pervan |
| 2005/0235593 A1 | 10/2005 | Hecht |
| 2005/0252130 A1 | 11/2005 | Martensson |
| 2005/0268570 A2 | 12/2005 | Pervan |
| 2006/0053724 A1 | 3/2006 | Braun et al. |
| 2006/0070333 A1 | 4/2006 | Pervan |
| 2006/0101769 A1 | 5/2006 | Pervan |
| 2006/0156670 A1 | 7/2006 | Knauseder |
| 2006/0174577 A1 | 8/2006 | O'Neil |
| 2006/0179754 A1 | 8/2006 | Yang |
| 2006/0236642 A1 | 10/2006 | Pervan |
| 2006/0260254 A1 | 11/2006 | Pervan et al. |
| 2006/0272262 A1 | 12/2006 | Pomberger |
| 2007/0006543 A1 | 1/2007 | Engström |
| 2007/0011981 A1 | 1/2007 | Eiserman |
| 2007/0028547 A1 | 2/2007 | Grafenauer |
| 2007/0065293 A1 | 3/2007 | Hannig |
| 2007/0108679 A1 | 5/2007 | Grothaus |
| 2007/0151189 A1 | 7/2007 | Yang et al. |
| 2007/0175156 A1 | 8/2007 | Pervan et al. |
| 2007/0193178 A1 | 8/2007 | Groeke et al. |
| 2007/0209736 A1 | 9/2007 | Deringor et al. |
| 2007/0214741 A1 | 9/2007 | Llorens Miravet |
| 2008/0000182 A1 | 1/2008 | Pervan |
| 2008/0000185 A1 | 1/2008 | Duernberger |
| 2008/0000186 A1 | 1/2008 | Pervan et al. |
| 2008/0000187 A1 | 1/2008 | Pervan et al. |
| 2008/0005998 A1 | 1/2008 | Pervan |
| 2008/0010931 A1 | 1/2008 | Pervan et al. |
| 2008/0010937 A1 | 1/2008 | Pervan et al. |
| 2008/0028707 A1 | 2/2008 | Pervan |
| 2008/0034708 A1 | 2/2008 | Pervan |
| 2008/0041008 A1 | 2/2008 | Pervan |
| 2008/0053029 A1 | 3/2008 | Ricker |
| 2008/0066415 A1 | 3/2008 | Pervan |
| 2008/0104921 A1 | 5/2008 | Pervan et al. |
| 2008/0110125 A1 | 5/2008 | Pervan |
| 2008/0134607 A1 | 6/2008 | Pervan |
| 2008/0134613 A1 | 6/2008 | Pervan |
| 2008/0134614 A1 | 6/2008 | Pervan |
| 2008/0155930 A1 | 7/2008 | Pervan et al. |
| 2008/0184646 A1 | 8/2008 | Alford |
| 2008/0216434 A1 | 9/2008 | Pervan |
| 2008/0216920 A1 | 9/2008 | Pervan |
| 2008/0236088 A1 | 10/2008 | Hannig |
| 2008/0295432 A1 | 12/2008 | Pervan et al. |
| 2008/0302044 A1 | 12/2008 | Johansson |
| 2009/0019806 A1 | 1/2009 | Muehlebach |
| 2009/0064624 A1 | 3/2009 | Sokol |
| 2009/0100782 A1 | 4/2009 | Groeke et al. |
| 2009/0133353 A1 | 5/2009 | Pervan et al. |
| 2009/0151290 A1 | 6/2009 | Liu |
| 2009/0173032 A1 | 7/2009 | Prager et al. |
| 2009/0193741 A1 | 8/2009 | Capelle |
| 2009/0193748 A1 | 8/2009 | Boo et al. |
| 2009/0193753 A1 | 8/2009 | Schitter |
| 2009/0217615 A1 | 9/2009 | Engstrom |
| 2009/0241460 A1 | 10/2009 | Beaulieu |
| 2009/0308014 A1 | 12/2009 | Muehlebach |
| 2010/0043333 A1 | 2/2010 | Hannig et al. |
| 2010/0083603 A1 | 4/2010 | Goodwin |
| 2010/0170189 A1 | 7/2010 | Schulte |
| 2010/0173122 A1 | 7/2010 | Susnjara |
| 2010/0281803 A1 | 11/2010 | Cappelle |
| 2010/0293879 A1 | 11/2010 | Pervan et al. |
| 2010/0300029 A1* | 12/2010 | Braun ............... E04F 15/02 52/588.1 |
| 2010/0300031 A1 | 12/2010 | Pervan et al. |
| 2010/0319290 A1 | 12/2010 | Pervan |
| 2010/0319291 A1 | 12/2010 | Pervan et al. |
| 2011/0016815 A1 | 1/2011 | Yang |
| 2011/0030303 A1 | 2/2011 | Pervan et al. |
| 2011/0041996 A1 | 2/2011 | Pervan |
| 2011/0047922 A1 | 3/2011 | Fleming, III |
| 2011/0088344 A1 | 4/2011 | Pervan et al. |
| 2011/0088345 A1 | 4/2011 | Pervan |
| 2011/0088346 A1 | 4/2011 | Hannig |
| 2011/0131916 A1 | 6/2011 | Chen |
| 2011/0154763 A1 | 6/2011 | Bergelin et al. |
| 2011/0162312 A1* | 7/2011 | Schulte ............... E04F 15/02 52/578 |
| 2011/0167750 A1 | 7/2011 | Pervan |
| 2011/0167751 A1 | 7/2011 | Engström |
| 2011/0173914 A1 | 7/2011 | Engström |
| 2011/0197535 A1 | 8/2011 | Baker et al. |
| 2011/0225921 A1 | 9/2011 | Schulte |
| 2011/0225922 A1 | 9/2011 | Pervan et al. |
| 2011/0252733 A1 | 10/2011 | Pervan |
| 2011/0271631 A1* | 11/2011 | Engstrom ............... E04F 15/02 52/582.2 |
| 2011/0271632 A1 | 11/2011 | Cappelle et al. |
| 2011/0283650 A1 | 11/2011 | Pervan et al. |
| 2012/0017533 A1 | 1/2012 | Pervan et al. |
| 2012/0031029 A1 | 2/2012 | Pervan et al. |
| 2012/0036804 A1 | 2/2012 | Pervan |
| 2012/0042598 A1 | 2/2012 | Vermeulen et al. |
| 2012/0055112 A1 | 3/2012 | Engström |
| 2012/0124932 A1 | 5/2012 | Schulte et al. |
| 2012/0151865 A1 | 6/2012 | Pervan et al. |
| 2012/0174515 A1 | 7/2012 | Pervan |
| 2012/0174519 A1* | 7/2012 | Schulte ............... E04F 13/08 52/588.1 |
| 2012/0174520 A1 | 7/2012 | Pervan |
| 2012/0174521 A1 | 7/2012 | Schulte et al. |
| 2012/0192521 A1 | 8/2012 | Schulte |
| 2012/0279161 A1 | 11/2012 | Håkansson et al. |
| 2012/0304590 A1 | 12/2012 | Engström |
| 2013/0008117 A1 | 1/2013 | Pervan |
| 2013/0008118 A1 | 1/2013 | Baert et al. |
| 2013/0014463 A1 | 1/2013 | Pervan |
| 2013/0019555 A1 | 1/2013 | Pervan |
| 2013/0025231 A1 | 1/2013 | Vermeulen et al. |
| 2013/0042562 A1 | 2/2013 | Pervan |

(56) References Cited

U.S. PATENT DOCUMENTS

| | | |
|---|---|---|
| 2013/0042563 A1 | 2/2013 | Pervan |
| 2013/0042564 A1* | 2/2013 | Pervan ............... E04F 13/0894 52/588.1 |
| 2013/0042565 A1 | 2/2013 | Pervan |
| 2013/0047536 A1 | 2/2013 | Pervan |
| 2013/0081349 A1 | 4/2013 | Pervan et al. |
| 2013/0111837 A1 | 5/2013 | Devos et al. |
| 2013/0111845 A1 | 5/2013 | Pervan |
| 2013/0145708 A1 | 6/2013 | Pervan |
| 2013/0152500 A1 | 6/2013 | Engström |
| 2013/0160391 A1 | 6/2013 | Pervan et al. |
| 2013/0167467 A1 | 7/2013 | Vermeulen et al. |
| 2013/0219806 A1* | 8/2013 | Carrubba .......... E04F 15/02033 52/58 |
| 2013/0232905 A2 | 9/2013 | Pervan |
| 2013/0239508 A1 | 9/2013 | Pervan et al. |
| 2013/0263454 A1 | 10/2013 | Boo et al. |
| 2013/0263547 A1 | 10/2013 | Boo |
| 2013/0283719 A1 | 10/2013 | Döhring et al. |
| 2013/0318906 A1 | 12/2013 | Pervan et al. |
| 2014/0007539 A1 | 1/2014 | Pervan et al. |
| 2014/0020324 A1 | 1/2014 | Pervan |
| 2014/0026513 A1 | 1/2014 | Bishop |
| 2014/0033634 A1 | 2/2014 | Pervan |
| 2014/0053497 A1 | 2/2014 | Pervan et al. |
| 2014/0059966 A1 | 3/2014 | Boo |
| 2014/0069043 A1 | 3/2014 | Pervan |
| 2014/0090335 A1 | 4/2014 | Pervan et al. |
| 2014/0109501 A1 | 4/2014 | Pervan |
| 2014/0109506 A1 | 4/2014 | Pervan et al. |
| 2014/0123586 A1 | 5/2014 | Pervan et al. |
| 2014/0130437 A1 | 5/2014 | Cappelle |
| 2014/0144096 A1 | 5/2014 | Vermeulen et al. |
| 2014/0150369 A1 | 6/2014 | Hannig |
| 2014/0186104 A1 | 7/2014 | Hamberger |
| 2014/0190112 A1 | 7/2014 | Pervan |
| 2014/0208677 A1 | 7/2014 | Pervan et al. |
| 2014/0223852 A1 | 8/2014 | Pervan |
| 2014/0237931 A1 | 8/2014 | Pervan |
| 2014/0250813 A1 | 9/2014 | Nygren et al. |
| 2014/0260060 A1 | 9/2014 | Pervan et al. |
| 2014/0283466 A1* | 9/2014 | Boo ................. E04F 15/02038 52/105 |
| 2014/0290173 A1 | 10/2014 | Hamberger |
| 2014/0305065 A1 | 10/2014 | Pervan |
| 2014/0366476 A1 | 12/2014 | Pervan |
| 2014/0373478 A2 | 12/2014 | Pervan et al. |
| 2014/0373480 A1 | 12/2014 | Pervan et al. |
| 2015/0000221 A1 | 1/2015 | Boo |
| 2015/0013260 A1 | 1/2015 | Pervan |
| 2015/0047284 A1 | 2/2015 | Cappelle |
| 2015/0059281 A1 | 3/2015 | Pervan |
| 2015/0089896 A2 | 4/2015 | Pervan et al. |
| 2015/0121796 A1 | 5/2015 | Pervan |
| 2015/0152644 A1 | 6/2015 | Boo |
| 2015/0167318 A1 | 6/2015 | Pervan |
| 2015/0176289 A1* | 6/2015 | Hannig ............... E04F 13/0894 52/582.2 |
| 2015/0176619 A1 | 6/2015 | Baker |
| 2015/0211239 A1 | 7/2015 | Pervan |
| 2015/0233125 A1 | 8/2015 | Pervan et al. |
| 2015/0267419 A1 | 9/2015 | Pervan |
| 2015/0300029 A1* | 10/2015 | Pervan ............... E04F 15/02038 52/582.2 |
| 2015/0330088 A1* | 11/2015 | Derelöv ............. E04F 13/0894 52/588.1 |
| 2015/0337537 A1 | 11/2015 | Boo |
| 2015/0337542 A1* | 11/2015 | Cappelle ................. E04F 15/10 52/309.13 |
| 2016/0032596 A1 | 2/2016 | Nygren et al. |
| 2016/0060879 A1 | 3/2016 | Pervan |
| 2016/0069088 A1 | 3/2016 | Boo et al. |
| 2016/0076260 A1 | 3/2016 | Pervan et al. |
| 2016/0090744 A1 | 3/2016 | Pervan et al. |
| 2016/0168866 A1 | 6/2016 | Pervan et al. |
| 2016/0186426 A1 | 6/2016 | Boo |
| 2016/0194884 A1 | 7/2016 | Pervan et al. |
| 2016/0201336 A1 | 7/2016 | Pervan |
| 2016/0251859 A1 | 9/2016 | Pervan et al. |
| 2016/0251860 A1 | 9/2016 | Pervan |
| 2016/0281368 A1 | 9/2016 | Pervan et al. |
| 2016/0281370 A1 | 9/2016 | Pervan et al. |
| 2016/0326751 A1 | 11/2016 | Pervan |
| 2016/0340913 A1 | 11/2016 | Derelöv |
| 2017/0037641 A1 | 2/2017 | Nygren et al. |
| 2017/0081860 A1 | 3/2017 | Boo |
| 2017/0254096 A1 | 9/2017 | Pervan |
| 2017/0321433 A1 | 11/2017 | Pervan et al. |
| 2017/0362834 A1 | 12/2017 | Pervan et al. |
| 2018/0001509 A1 | 1/2018 | Myllykangas et al. |
| 2018/0001510 A1 | 1/2018 | Fransson |
| 2018/0001573 A1 | 1/2018 | Blomgren et al. |
| 2018/0002933 A1 | 1/2018 | Pervan |
| 2018/0016783 A1 | 1/2018 | Boo |
| 2018/0030737 A1 | 2/2018 | Pervan |
| 2018/0030738 A1 | 2/2018 | Pervan |

FOREIGN PATENT DOCUMENTS

| | | |
|---|---|---|
| DE | 138 992 C | 7/1901 |
| DE | 142 293 C | 7/1902 |
| DE | 2 159 042 | 6/1973 |
| DE | 25 05 489 A1 | 8/1976 |
| DE | 33 43 601 A1 | 6/1985 |
| DE | 33 43 601 C2 | 6/1985 |
| DE | 39 32 980 A1 | 11/1991 |
| DE | 42 15 273 A1 | 11/1993 |
| DE | 42 42 530 A1 | 6/1994 |
| DE | 196 01 322 A | 5/1997 |
| DE | 299 22 649 U1 | 4/2000 |
| DE | 200 01 788 U1 | 6/2000 |
| DE | 200 02 744 U1 | 6/2000 |
| DE | 199 40 837 A1 | 11/2000 |
| DE | 199 58 225 A1 | 6/2001 |
| DE | 202 05 774 U1 | 8/2002 |
| DE | 203 20 799 U1 | 4/2005 |
| DE | 10 2004 055 951 A1 | 7/2005 |
| DE | 10 2004 001 363 A1 | 8/2005 |
| DE | 10 2005 002 297 A1 | 8/2005 |
| DE | 10 2004 054 368 A1 | 5/2006 |
| DE | 10 2005 024 366 A1 | 11/2006 |
| DE | 10 2006 024 184 A1 | 11/2007 |
| DE | 10 2006 037 614 B3 | 12/2007 |
| DE | 10 2006 057 491 A1 | 6/2008 |
| DE | 10 2007 018 309 A1 | 8/2008 |
| DE | 10 2007 016 533 A1 | 10/2008 |
| DE | 10 2007 032 885 A1 | 1/2009 |
| DE | 10 2007 035 648 A1 | 1/2009 |
| DE | 10 2007 049 792 A1 | 2/2009 |
| DE | 10 2009 048 050 B3 | 1/2011 |
| DE | 10 2009 041 297 A1 | 3/2011 |
| EP | 0 013 852 A1 | 8/1980 |
| EP | 0 871 156 A2 | 10/1998 |
| EP | 0 974 713 A1 | 1/2000 |
| EP | 1 120 515 A1 | 8/2001 |
| EP | 1 146 182 A2 | 10/2001 |
| EP | 1 251 219 A | 10/2002 |
| EP | 1 350 904 A2 | 10/2003 |
| EP | 1 350 904 A3 | 10/2003 |
| EP | 1 396 593 A2 | 3/2004 |
| EP | 1 420 125 A2 | 5/2004 |
| EP | 1 437 457 A2 | 7/2004 |
| EP | 1 640 530 A2 | 3/2006 |
| EP | 1 650 375 A1 | 4/2006 |
| EP | 1 650 375 A8 | 9/2006 |
| EP | 1 980 683 A2 | 10/2008 |
| EP | 2 000 610 A1 | 12/2008 |
| EP | 2 017 403 A2 | 1/2009 |
| EP | 2 034 106 A1 | 3/2009 |
| EP | 2 063 045 A2 | 5/2009 |
| EP | 2 078 801 A | 7/2009 |
| EP | 2 236 694 A1 | 10/2010 |
| EP | 2 270 291 A1 | 1/2011 |

(56) References Cited

FOREIGN PATENT DOCUMENTS

| | | |
|---|---|---|
| EP | 2 270 291 B1 | 5/2011 |
| EP | 2 333 195 A1 | 6/2011 |
| EP | 2 388 409 A2 | 11/2011 |
| EP | 2 395 179 A2 | 12/2011 |
| EP | 2 078 801 B1 | 3/2012 |
| EP | 2 570 564 A2 | 3/2013 |
| EP | 2 734 684 A1 | 5/2014 |
| EP | 2 333 195 B1 | 7/2014 |
| EP | 2 734 684 B1 | 8/2016 |
| FR | 1.138.595 | 6/1957 |
| FR | 2 256 807 | 8/1975 |
| FR | 2 810 060 A1 | 12/2001 |
| GB | 240629 | 10/1925 |
| GB | 376352 | 7/1932 |
| GB | 1171337 | 11/1969 |
| GB | 2 051 916 A | 1/1981 |
| JP | 03-110258 A | 5/1991 |
| JP | 05-018028 A | 1/1993 |
| JP | 6-146553 A | 5/1994 |
| JP | 6-288017 A | 10/1994 |
| JP | 6-306961 A | 11/1994 |
| JP | 6-322848 A | 11/1994 |
| JP | 7-300979 A | 11/1995 |
| JP | 2002-047782 A | 2/2002 |
| SE | 526 688 C2 | 5/2005 |
| SE | 529 076 C2 | 4/2007 |
| WO | WO 94/26999 A1 | 11/1994 |
| WO | WO 96/23942 A1 | 8/1996 |
| WO | WO 96/27721 A1 | 9/1996 |
| WO | WO 97/47834 A1 | 12/1997 |
| WO | WO 98/21428 A1 | 5/1998 |
| WO | WO 98/22677 A1 | 5/1998 |
| WO | WO 98/58142 A1 | 12/1998 |
| WO | WO 99/66151 A1 | 12/1999 |
| WO | WO 99/66152 A1 | 12/1999 |
| WO | WO 00/20705 A1 | 4/2000 |
| WO | WO 00/20706 A1 | 4/2000 |
| WO | WO 00/43281 A2 | 7/2000 |
| WO | WO 00/47841 A1 | 8/2000 |
| WO | WO 00/55067 A1 | 9/2000 |
| WO | WO 01/02669 A1 | 1/2001 |
| WO | WO 01/02670 A1 | 1/2001 |
| WO | WO 01/02671 A1 | 1/2001 |
| WO | WO 01/02672 A1 | 1/2001 |
| WO | WO 01/07729 A1 | 2/2001 |
| WO | WO 01/38657 A1 | 5/2001 |
| WO | WO 01/44669 A2 | 6/2001 |
| WO | WO 01/44669 A3 | 6/2001 |
| WO | WO 01/48331 A1 | 7/2001 |
| WO | WO 01/48332 A1 | 7/2001 |
| WO | WO 01/51732 A1 | 7/2001 |
| WO | WO 01/51733 A1 | 7/2001 |
| WO | WO 01/66877 A1 | 9/2001 |
| WO | WO 01/75247 A1 | 10/2001 |
| WO | WO 01/77461 A1 | 10/2001 |
| WO | WO 01/94721 A1 | 12/2001 |
| WO | WO 01/94721 A8 | 12/2001 |
| WO | WO 01/98604 A1 | 12/2001 |
| WO | WO 02/48127 | 6/2002 |
| WO | WO 02/055809 A1 | 7/2002 |
| WO | WO 02/055810 A1 | 7/2002 |
| WO | WO 02/081843 A1 | 10/2002 |
| WO | WO 02/103135 A1 | 12/2002 |
| WO | WO 03/012224 A1 | 2/2003 |
| WO | WO 03/016654 A1 | 2/2003 |
| WO | WO 03/025307 A1 | 3/2003 |
| WO | WO 03/038210 A1 | 5/2003 |
| WO | WO 03/044303 A1 | 5/2003 |
| WO | WO 03/069094 A1 | 8/2003 |
| WO | WO 03/074814 A1 | 9/2003 |
| WO | WO 03/083234 A1 | 10/2003 |
| WO | WO 03/087497 A1 | 10/2003 |
| WO | WO 03/089736 A1 | 10/2003 |
| WO | WO 2004/016877 A1 | 2/2004 |
| WO | WO 2004/020764 A1 | 3/2004 |
| WO | WO 2004/048716 A1 | 6/2004 |
| WO | WO 2004/050780 A2 | 6/2004 |
| WO | WO 2004/079128 A1 | 9/2004 |
| WO | WO 2004/079130 A1 | 9/2004 |
| WO | WO 2004/083557 A1 | 9/2004 |
| WO | WO 2004/085765 A1 | 10/2004 |
| WO | WO 2005/003488 A1 | 1/2005 |
| WO | WO 2005/003489 A1 | 1/2005 |
| WO | WO 2005/054599 A1 | 6/2005 |
| WO | WO 2006/043893 A1 | 4/2006 |
| WO | WO 2006/050928 A1 | 5/2006 |
| WO | WO 2006/104436 A1 | 10/2006 |
| WO | WO 2006/123988 A1 | 11/2006 |
| WO | WO 2006/125646 A1 | 11/2006 |
| WO | WO 2007/015669 A2 | 2/2007 |
| WO | WO 2007/019957 A1 | 2/2007 |
| WO | WO 2007/079845 A1 | 7/2007 |
| WO | WO 2007/089186 A1 | 8/2007 |
| WO | WO 2007/118352 A1 | 10/2007 |
| WO | WO 2007/141605 A2 | 12/2007 |
| WO | WO 2007/142589 A1 | 12/2007 |
| WO | WO 2008/004960 A2 | 1/2008 |
| WO | WO 2008/004960 A8 | 1/2008 |
| WO | WO 2008/017281 A1 | 2/2008 |
| WO | WO 2008/017301 A2 | 2/2008 |
| WO | WO 2008/017301 A3 | 2/2008 |
| WO | WO 2008/060232 A1 | 5/2008 |
| WO | WO 2008/068245 A1 | 6/2008 |
| WO | WO 2008/116623 A1 | 10/2008 |
| WO | WO 2009/013590 A2 | 1/2009 |
| WO | WO 2009/066153 A2 | 5/2009 |
| WO | WO 2009/116926 A1 | 9/2009 |
| WO | WO 2010/006684 A2 | 1/2010 |
| WO | WO 2010/028621 A1 | 3/2010 |
| WO | WO 2010/070472 A2 | 6/2010 |
| WO | WO 2010/070605 A2 | 6/2010 |
| WO | WO 2010/082171 A2 | 7/2010 |
| WO | WO 2010/087752 A1 | 8/2010 |
| WO | WO 2010/105732 A1 | 9/2010 |
| WO | WO 2010/108980 A1 | 9/2010 |
| WO | WO 2010/136171 A1 | 12/2010 |
| WO | WO 2011/001326 A2 | 1/2011 |
| WO | WO 2011/012104 A2 | 2/2011 |
| WO | WO 2011/012105 A1 | 2/2011 |
| WO | WO 2011/032540 A2 | 3/2011 |
| WO | WO 2011/038709 A1 | 4/2011 |
| WO | WO 2011/085788 A1 | 7/2011 |
| WO | WO 2011/108812 A2 | 9/2011 |
| WO | WO 2011/127981 A1 | 10/2011 |
| WO | WO 2011/151758 A2 | 12/2011 |
| WO | WO 2013/012386 A1 | 1/2013 |
| WO | WO 2013/017574 A1 | 2/2013 |
| WO | WO 2013/017575 A1 | 2/2013 |
| WO | WO 2013/025163 A1 | 2/2013 |
| WO | WO 2013/025164 A1 | 2/2013 |
| WO | WO 2013/083629 A1 | 6/2013 |
| WO | WO 2013/087190 A1 | 6/2013 |
| WO | WO 2013/151493 A1 | 10/2013 |

OTHER PUBLICATIONS

U.S. Appl. No. 13/544,281, filed Jul. 9, 2012, Darko Pervan, (Cited herein as US Patent Application Publication No. 2013/0014463 A1 of Jan. 17, 2013 and as US Patent Application Publication No. 2013/0232905 A2 of Sep. 12, 2013).

U.S. Appl. No. 14/046,235, filed Oct. 4, 2013, Darko Pervan, Niclas Håkansson and Per Nygren, (Cited herein as US Patent Application Publication No. 2014/0053497 A1 of Feb. 27, 2014).

U.S. Appl. No. 14/152,402, filed Jan. 10, 2014, Darko Pervan and Tony Pervan, (Cited herein as US Patent Application Publication No. 2014/0123586 A1of May 8, 2014 and as US Patent Application Publication 2015/0089896 A2 of Apr. 2, 2015).

U.S. Appl. No. 14/206,286, filed Mar. 12, 2014, Darko Pervan and Marcus Bergelin, (Cited herein as US Patent Application Publication No. 2014/0190112 A1 of Jul. 10, 2014).

U.S. Appl. No. 14/258,742, filed Apr. 22, 2014, Darko Pervan, (Cited herein as US Patent Application Publication No. 2014/0223852 A1 of Aug. 14, 2014).

(56) References Cited

OTHER PUBLICATIONS

U.S. Appl. No. 14/294,230, filed Jun. 3, 2014, Darko Pervan and Agne Pålsson, (Cited herein as US Patent Application Publication No. 2014/0260060 A1 of Sep. 18, 2014).
U.S. Appl. No. 14/315,879, filed Jun. 26, 2014, Christian Boo, (Cited herein as US Patent Application Publication No. 2015/0000221 A1 of Jan. 1, 2015).
U.S. Appl. No. 14/463,972, filed Aug. 20, 2014, Darko Pervan and Agne Pålsson, (Cited herein as US Patent Application Publication No. 2014/0366476 A1 of Dec. 18, 2014).
U.S. Appl. No. 14/503,780, filed Oct. 1, 2014, Darko Pervan, (Cited herein as US Patent Application Publication No. 2015/0013260 A1 of Jan. 15, 2015).
U.S. Appl. No. 14/538,223, filed Nov. 11, 2014, Darko Pervan, (Cited herein as US Patent Application Publication No. 2015/0059281 A1 of Mar. 5, 2015).
U.S. Appl. No. 14/597,578, filed Jan. 15, 2015, Darko Pervan, (Cited herein as US Patent Application Publication No. 2015/0121796 A1 of May 7, 2015).
U.S. Appl. No. 14/633,480, filed Feb. 27, 2015, Darko Pervan, (Cited herein as US Patent Application Publication No. 2015/0167318 A1 of Jun. 18, 2015).
U.S. Appl. No. 14/683,340, filed Apr. 10, 2015, Darko Pervan, (Cited herein as US Patent Application Publication No. 2015/0211239 A1 of Jul. 30, 2015).
U.S. Appl. No. 14/701,959, filed May 1, 2015, Darko Pervan and Tony Pervan, (Cited herein as US Patent Application Publication No. 2015/0233125 A1 of Aug. 20, 2015).
U.S. Appl. No. 14/709,913, filed May 12, 2015, Peter Derelov, (Cited herein as US Patent Application Publication No. 2015/0330088 A1 of Nov. 19, 2015).
U.S. Appl. No. 14/646,567, filed May 21, 2015, Darko Pervan, (Cited herein as US Patent Application Publication No. 2015/0300029 A1 of Oct. 22, 2015).
U.S. Appl. No. 14/730,691, filed Jun. 4, 2015, Darko Pervan, (Cited herein as US Patent Application Publication No. 2015/0267419 A1 of Sep. 24, 2015).
U.S. Appl. No. 14/938,612, filed Nov. 11, 2015, Darko Pervan.
U.S. Appl. No. 14/962,291, filed Dec. 8, 2015, Darko Pervan, Niclas Håkansson and Per Nygren.
U.S. Appl. No. 14/938,612, Pervan.
U.S. Appl. No. 14/962,291, Pervan, et al.
Välinge Innovation AB, Technical Disclosure entitled "Mechanical locking for floor panels with a flexible bristle tongue," IP.com No. IPCOM000145262D, Jan. 12, 2007, IP.com PriorArtDatabase, 57 pages.
Engstrand, Ola (Contact)/Välinge Innovation AB, Technical Disclosure entitled "VA-038 Mechanical Locking of Floor Panels With Vertical Folding," IP com No. IPCOM000179246D, Feb. 10, 2009, IP.com Prior Art Database, 59 pages.
Engstrand, Ola (Contact)/Välinge Innovation AB, Technical Disclosure entitled "VA043 5G Linear Slide Tongue," IP com No. IPCOM000179015D, Feb. 4, 2009, IP.com Prior Art Database, 126 pages.
Engstrand, Ola (Owner)/Välinge Innovation AB, Technical Disclosure entitled "VA043b PCT Mechanical Locking of Floor Panels," IP com No. IPCOM000189420D, Nov. 9, 2009, IP.com Prior Art Database, 62 pages.
Engstrand, Ola (Contact)/Välinge Innovation AB, Technical Disclosure entitled "VA055 Mechanical locking system for floor panels," IP com No. IPCOM000206454D, Apr. 27, 2011, IP.com Prior Art Database, 25 pages.
Engstrand, Ola (Contact)/Välinge Innovation AB, Technical Disclosure entitled "VA058 Rocker Tongue," IP com No. IPCOM000203832D, Feb. 4, 2011, IP.com Prior Art Database, 22 pages.
Pervan, Darko (Author)/Välinge Flooring Technology, Technical Disclosure entitled "VA066b Glued Tongue," IP com No. IPCOM000210865D, Sep. 13, 2011, IP.com Prior Art Database, 19 pages.

Pervan, Darko (Inventor)/Välinge Flooring Technology AB, Technical Disclosure entitled "VA067 Fold Slide Loc," IP com No. IPCOM000208542D, Jul. 12, 2011, IP.com Prior Art Database, 37 pages.
Pervan, Darko (Author)/Välinge Flooring Technology, Technical Disclosure entitled "VA068 Press Lock VFT," IP com No. IPCOM000208854D, Jul. 20, 2011, IP.com Prior Art Database, 25 pages.
Pervan, Darko (Author), Technical Disclosure entitled "VA069 Combi Tongue," IP com No. IPCOM000210866D, Sep. 13, 2011, IP.com Prior Art Database, 41 pages.
Pervan, Darko (Author), Technical Disclosure entitled "VA070 Strip Part," IP com No. IPCOM000210867D, Sep. 13, 2011, IP.com Prior Art Database, 43 pages.
Pervan, Darko (Author), Technical Disclosure entitled "VA071 Pull Lock," IP com No. IPCOM000210868D, Sep. 13, 2011, IP.com Prior Art Database, 22 pages.
Pervan, Darko (Author), Technical Disclosure entitled "VA073a Zip Loc," IP com No. IPCOM000210869D, Sep. 13, 2011, IP.com Prior Art Database, 36 pages.
LifeTips, "Laminate Flooring Tips," available at (http://flooring.lifetips.com/cat/61734/laminate-flooring-tips/index.html), 2000, 12 pages.
Pervan, Darko, U.S. Appl. No. 14/938,612, entitled "Mechanical Locking System for Floor Panels," filed in the U.S. Patent and Trademark Office on Nov. 11, 2015.
Pervan, Darko, et al., U.S. Appl. No. 14/962,291, entitled "Mechanical Locking System for Floor Panels," filed in the U.S. Patent and Trademark Office on Dec. 8, 2015.
U.S. Appl. No. 15/160,311, filed May 20, 2016, Darko Pervan.
U.S. Appl. No. 15/172,926, filed Jun. 3, 2016, Darko Pervan and Agne Pålsson.
U.S. Appl. No. 15/175,768, filed Jun. 7, 2016, Darko Pervan.
U.S. Appl. No. 15/217,023, filed Jul. 22, 2016, Darko Pervan and Agne Pålsson.
U.S. Appl. No. 15/229,575, filed Aug. 5, 2016, Peter Derelov.
U.S. Appl. No. 15/160,311, Pervan.
U.S. Appl. No. 15/172,926, Pervan, et al.
U.S. Appl. No. 15/175,768, Pervan, et al.
U.S. Appl. No. 15/217,023, Pervan, et al.
U.S. Appl. No. 15/229,575, Derelöv.
Pervan, Darko, U.S. Appl. No. 15/160,311, entitled "Mechanical Locking System for Floor Panels," filed in the U.S. Patent and Trademark Office May 20, 2016.
Pervan, Darko, et al., U.S. Appl. No. 15/172,926, entitled "Mechanical Locking of Floor Panels with a Flexible Bristle Tongue," filed in the U.S. Patent and Trademark Office on Jun. 3, 2016.
Pervan, Darko, et al., U.S. Appl. No. 15/175,768, entitled "Mechanical Locking System for Floor Panels," filed in the U.S. Patent and Trademark Office on Jun. 7, 2016.
Pervan, Darko, et al., U.S. Appl. No. 15/217,023, entitled "Mechanical Locking System for Floor Panels," filed in the U.S. Patent and Trademark Office on Jul. 22, 2016.
Derelöv, Peter, U.S. Appl. No. 15/229,575, entitled "Building Panel with a Mechanical Locking System," filed in the U.S. Patent and Trademark Office on Aug. 5, 2016.
U.S. Appl. No. 15/048,252, filed Feb. 19, 2016, Darko Pervan and Tony Pervan.
U.S. Appl. No. 15/148,820, filed May 6, 2016, Darko Pervan.
U.S. Appl. No. 15/048,252, Pervan, et al.
U.S. Appl. No. 15/148,820, Pervan.
Pervan, Darko, et al., U.S. Appl. No. 15/048,252, entitled "Mechanical Locking System for Floor Panels," filed in the U.S. Patent and Trademark Office Feb. 19, 2016.
Pervan, Darko, U.S. Appl. No. 15/148,820, entitled "Mechanical Locking System for Panels and Method of Installing Same," filed in the U.S. Patent and Trademark Office May 6, 2016.
U.S. Appl. No. 15/261,071, filed Sep. 9, 2016, Darko Pervan.
U.S. Appl. No. 15/261,071, Pervan.
International Search Report dated Mar. 24, 2016 in PCT/SE2015/051270, 7 pages ISA/SE, Patent-och registreringsverket, Stockholm, SE.

(56) References Cited

OTHER PUBLICATIONS

Pervan: Darko, U.S. Appl. No. 15/261,071, entitled "Mechanical Locking System for Floor Panels," filed in the U.S. Patent and Trademark Office on Sep. 9, 2016.
U.S. Appl. No. 15/726,853, filed Oct. 6, 2017, Darko Pervan.
U.S. Appl. No. 15/813,855, filed Nov. 15, 2017, Darko Pervan.
U.S. Appl. No. 15/855,389, filed Dec. 27, 2017, Darko Pervan and Tony Pervan.
U.S. Appl. No. 15/726,853, Pervan.
U.S. Appl. No. 15/813,855, Pervan.
U.S. Appl. No. 15/855,389, Pervan, et al.
Pervan, Darko, U.S. Appl. No. 15/726,853 entitled "Mechanical Locking System for Panels and Method of Installing Same," filed in the U.S. Patent and Trademark Office Oct. 6, 2017.
Pervan, Darko, U.S. Appl. No. 15/813,855 entitled "Mechanical Locking of Floor Panels with a Glued Tongue," filed in the U.S. Patent and Trademark Office Nov. 15, 2017.
Pervan, Darko, et al., U.S. Appl. No. 15/855,389 entitled "Mechanical Locking System for Floor Panels," filed in the U.S. Patent and Trademark Office on Dec. 27, 2017.
U.S. Appl. No. 15/603,913, filed May 24, 2017, Darko Pervan.
U.S. Appl. No. 15/603,913, Pervan.
Pervan, Darko, U.S. Appl. No. 15/603,913 entitled "Mechanical Locking System for Floor Panels," filed in the U.S. Patent and Trademark Office on May 24, 2017.
U.S. Appl. No. 15/896,571, filed Feb. 14, 2018, Darko Pervan, Niclas Håkansson and Per Nygren.
U.S. Appl. No. 15/896,571, Pervan, et al.
Pervan, Darko, et al., U.S. Appl. No. 15/896,571 entitled "Mechanical Locking of Floor Panels with a Flexible Tongue," filed in the U.S. Patent and Trademark Office on Feb. 14, 2018.
U.S. Appl. No. 15/365,546, filed Nov. 30, 2016, Christian Boo.
U.S. Appl. No. 15/365,546, Boo.
Boo Christian, U.S. Appl. No. 15/365,546, entitled "Building Panel With a Mechanical Locking System," filed in the U.S. Patent and Trademark office on Nov. 30, 2016.
Extended European Search Report dated Jun. 6, 2018 in EP Application No. 15862298.5, European Patent Office, Munich, DE, 11 pages.

* cited by examiner

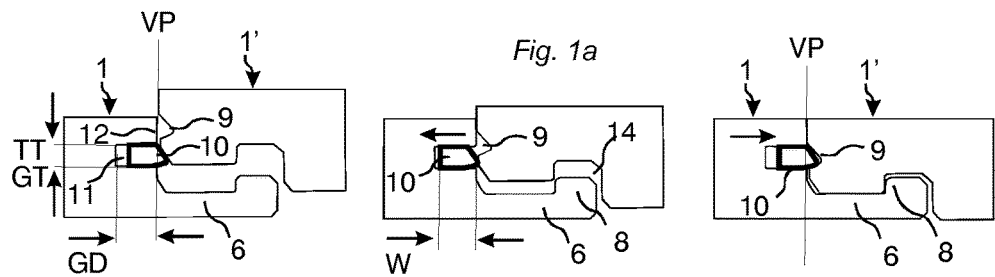
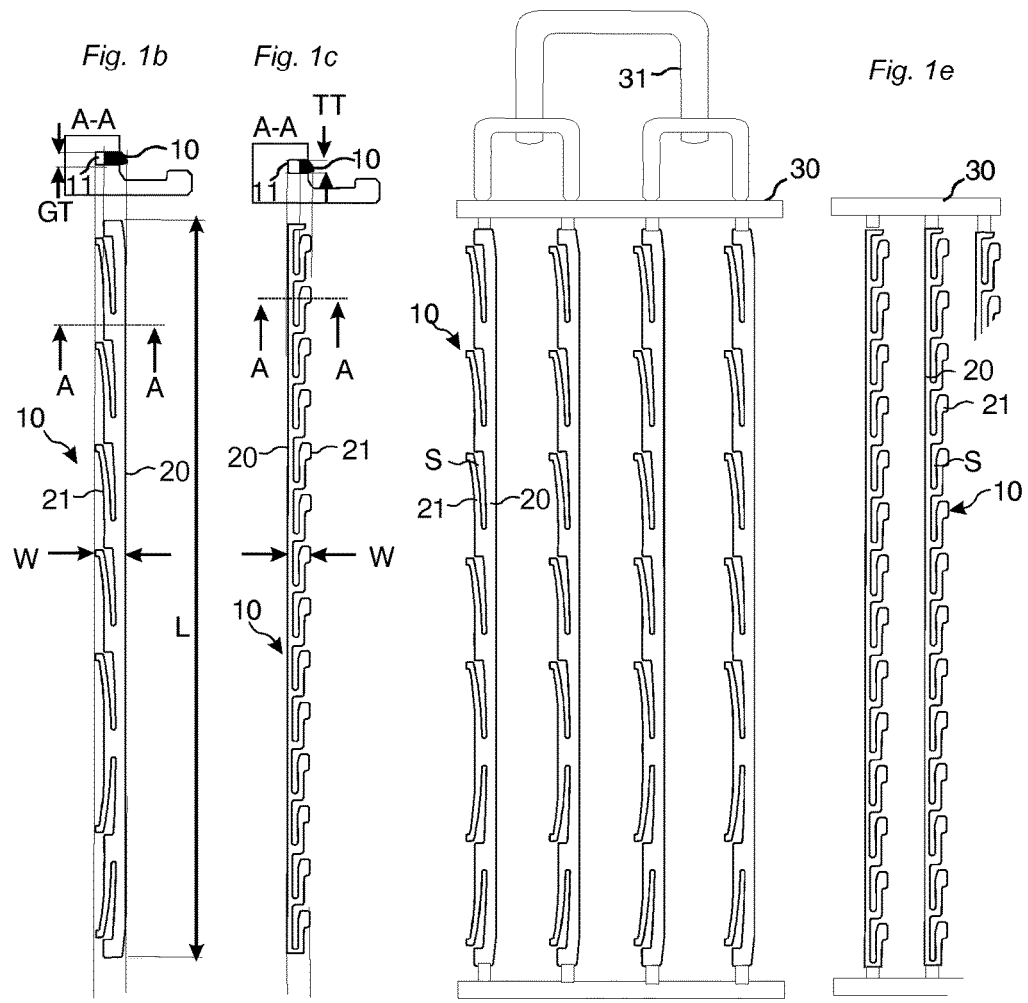
PRIOR ART

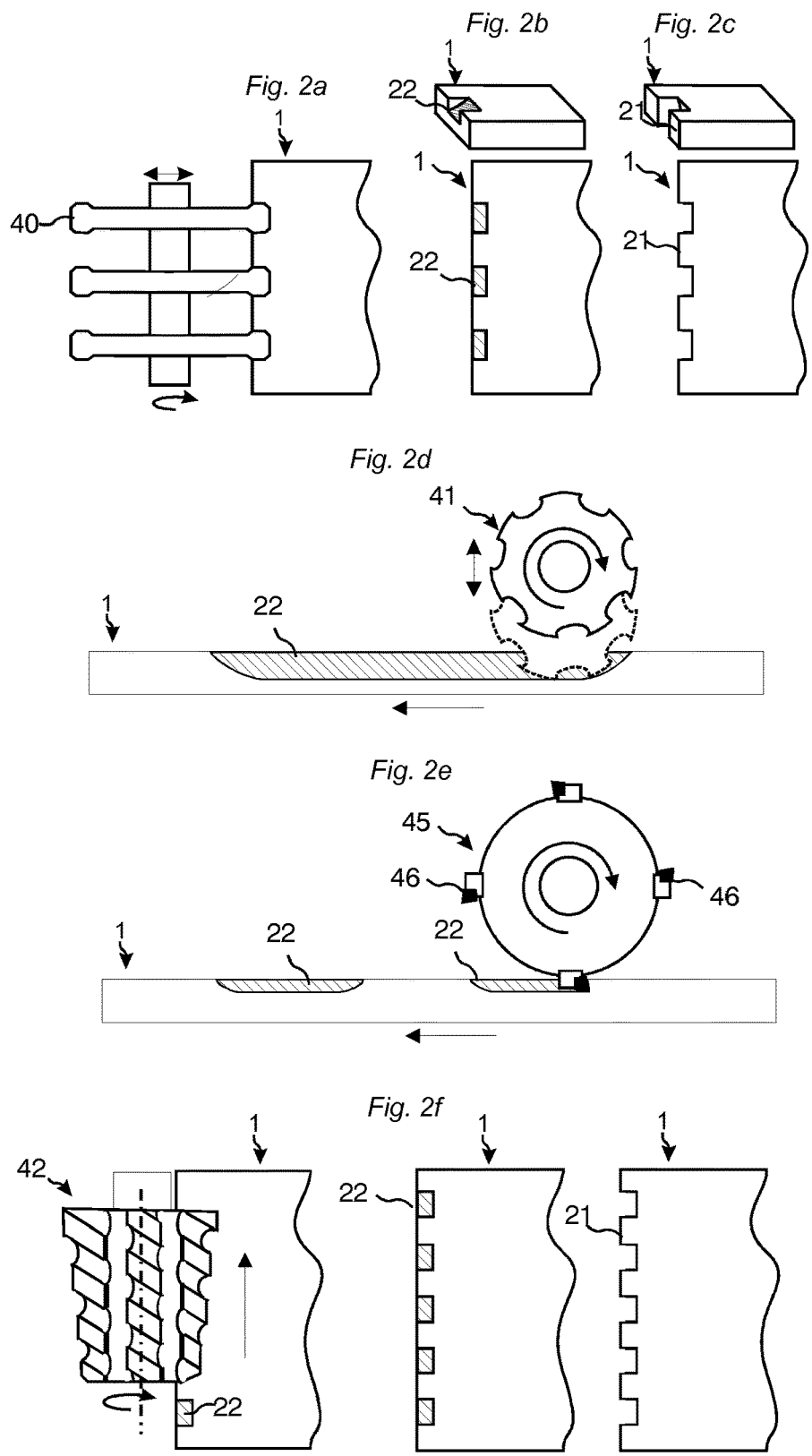

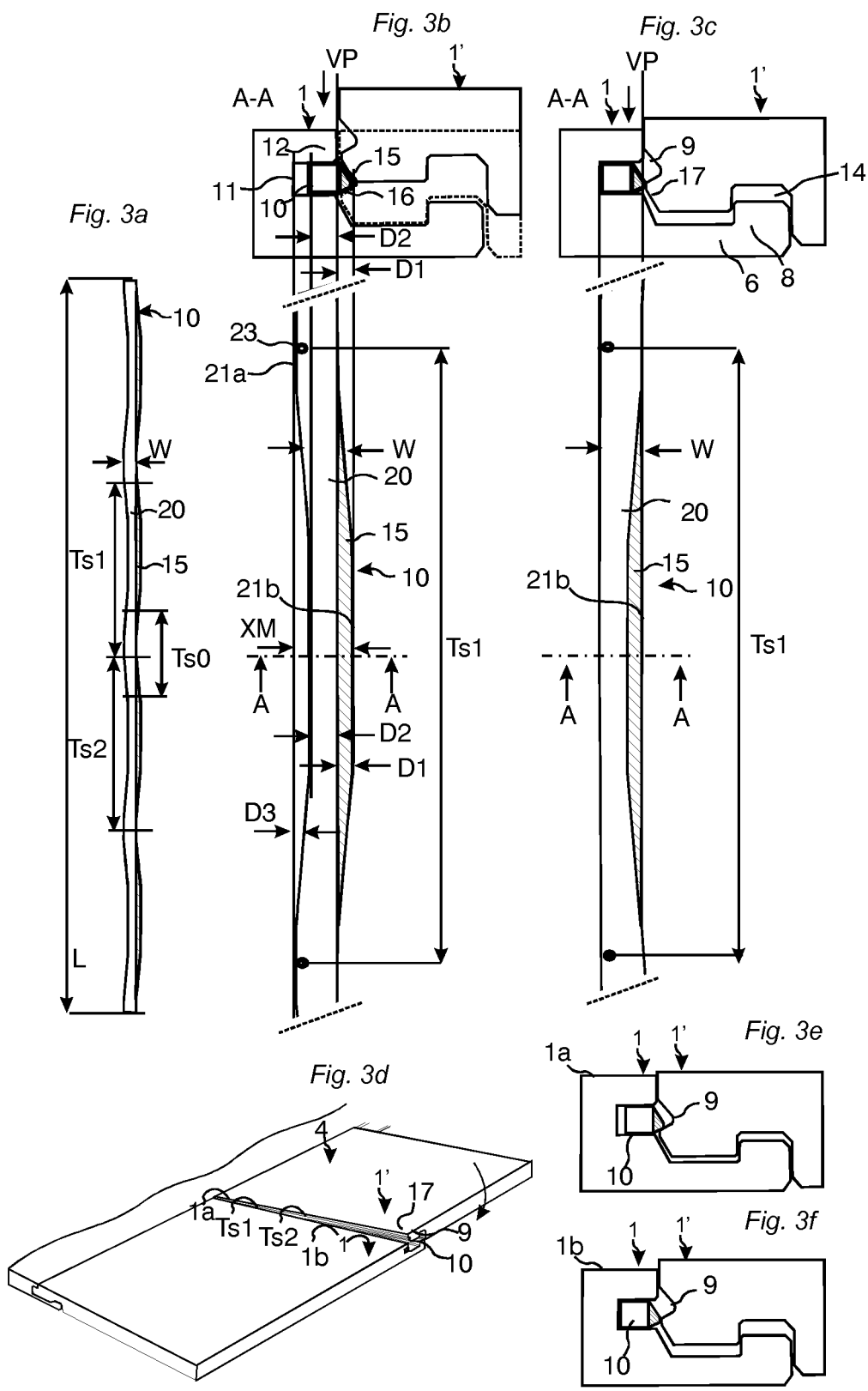

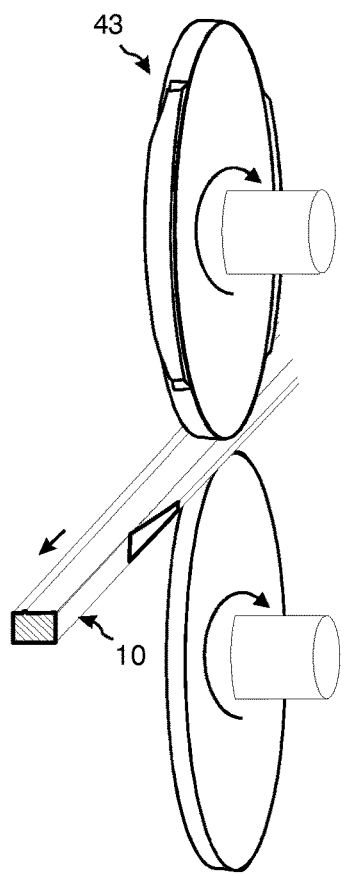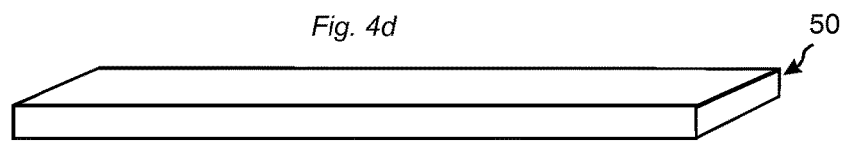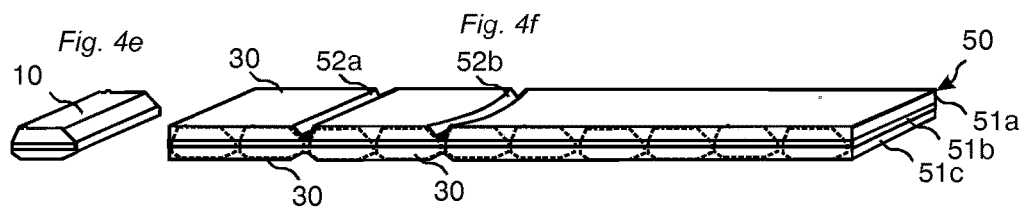

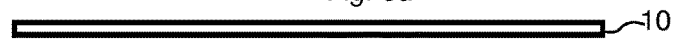
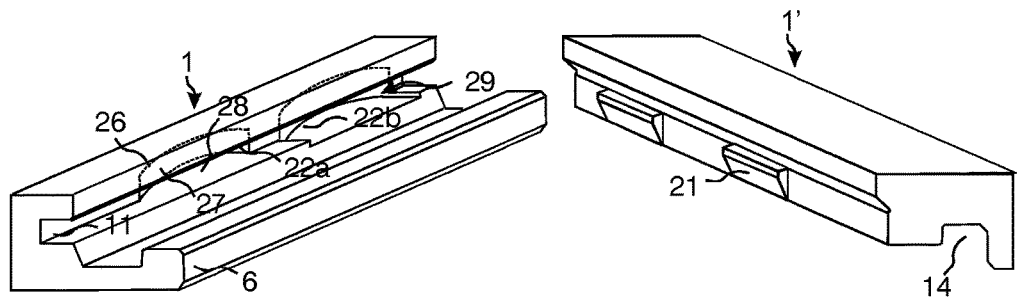
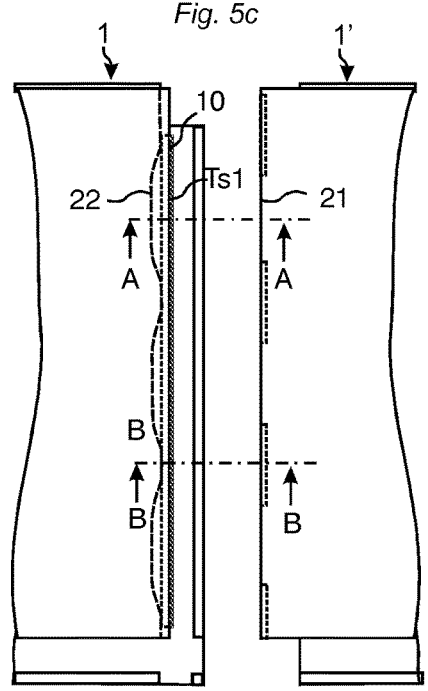
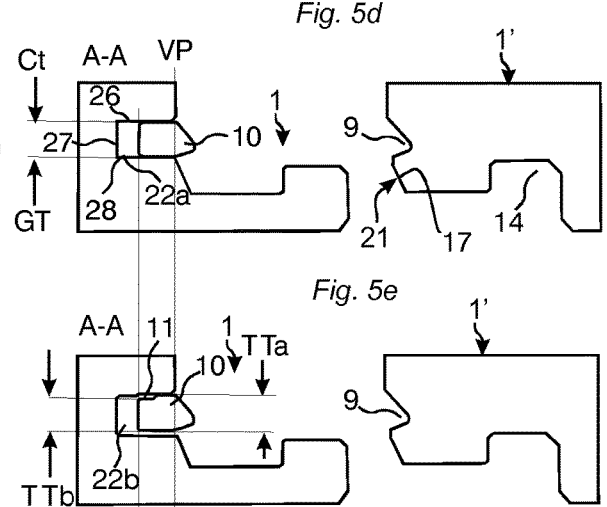
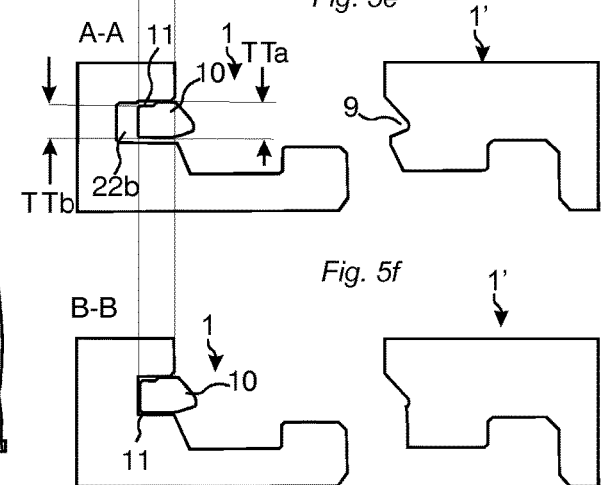
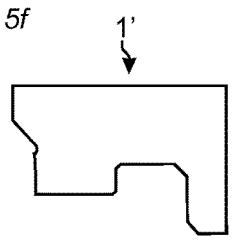

MECHANICAL LOCKING SYSTEM FOR FLOOR PANELS

CROSS REFERENCE TO RELATED APPLICATIONS

The present application claims the benefit of Swedish Application No. 1451438-4, filed on Nov. 27, 2014. The entire contents of Swedish Application No. 1451438-4 are hereby incorporated herein by reference in their entirety.

TECHNICAL FIELD

The disclosure generally relates to the field of mechanical locking systems for floor panels and building panels. The disclosure shows floorboards, locking systems and production methods.

FIELD OF APPLICATION OF THE INVENTION

Embodiments of the present invention are particularly suitable for use in thin floating floors, which are formed of floor panels which are joined mechanically with a locking system preferably integrated with the floor panel, i.e. mounted at the factory, are made up of one or more upper layers of thermoplastic or thermosetting material or wood veneer, an intermediate core of wood-fibre-based material or plastic material and preferably a lower balancing layer on the rear side of the core. Embodiments of the invention can also be used for joining building panels which preferably contain a board material for instance wall panels, ceilings, furniture components and similar. It may also be used to connect ceramic tiles.

The following description of prior-art technique, problems of known systems and objects and features of embodiments of the invention will therefore, as a non-restrictive example, be aimed above all at this field of application and in particular at floor panels and especially at laminate floors and thin resilient thermoplastic floor panels such as so called luxury vinyl tiles, generally referred to as LVT, formed as rectangular floor panels with long and shorts edges intended to be mechanically joined to each other on both long and short edges.

The long and short edges are mainly used to simplify the description of embodiments of the invention. The panels may be square. Floor panels are generally produced with the surface layer pointing downwards in order to eliminate thickness tolerances of the core material. The major part of the embodiments is shown with the surface pointing upwards in order to simplify the description.

It should be emphasized that embodiments of the invention can be used in any floor panel on long and/or short edges and it may be combined with all types of known locking system on long or short edges that lock the panels in the horizontal and/or vertical direction.

BACKGROUND OF THE INVENTION

Relevant parts of this prior art description are also a part of embodiments of the invention.

Several floor panels on the market are installed in a floating manner with mechanical locking systems formed at the long and short edges. These systems comprise locking means, which lock the panels horizontally and vertically. The mechanical locking systems are usually formed by machining of the core of the panel. Alternatively, parts of the locking system can be formed of a separate material, for instance aluminium or plastic material, which is integrated with the floor panel, i.e. joined with the floor panel in connection with the manufacture thereof.

Laminate flooring usually comprise a 6-8 millimetre, mm, wood based core, a 0.2 mm thick upper decorative surface layer of laminate and a 0.1 mm thick lower balancing layer of laminate, plastic, paper or like material. A laminate surface comprises melamine-impregnated paper. The most common core material is fibreboard with high density and good stability usually called HDF—High Density Fibreboard. The impregnated paper is laminated to the core with heat and pressure. HDF material is hard and has a low flexibility especially in the vertical direction perpendicular to the fibre orientation.

Recently a new type of powder based laminate floors, generally referred to as WFF floors (Wood Fibre Floors), have been introduced. Impregnated paper is replaced with a dry powder mix comprising wood fibres, melamine particles, aluminium oxide and pigments. The powder is applied on an HDF core and cured under heat and pressure. Generally, high quality HDF is used with a high resin content and low water swelling. Advanced decors may be formed by means of digital printing. Water based ink may be injected into the upper surface of the powder or injected in several transparent powder layers prior to pressing such that a very wear resistant 3D-print may be obtained. A digital binder and powder printing generally referred to as the "BAP method" may also be used to create advanced 3D-prints. Pigmented powder, or so-called dry ink, may be bonded in several layers with a digitally applied binder pattern comprising blank ink without pigments. The high wear resistance is often used to produce copies of stone and tiles. Such WFF floors may be rather wide and the material cost for the short edge locking system may be rather high.

LVT flooring with a thickness of 3-6 mm usually comprises a transparent wear layer which may be coated with an ultra-violet, UV, cured polyurethane, PU, lacquer and a decorative plastic foil under the transparent foil. The wear layer and the decorative foil are laminated to one or several core layers comprising a mix of thermoplastic material and mineral fillers. The plastic core is generally soft and very flexible.

Wood Plastic Composite floors, generally referred to as WPC floors, are similar to LVT floors. The core comprises thermosetting material mixed with wood fibre fillers and is generally stronger and much more rigid than the mineral based LVT core.

Thermoplastic material such as polyvinyl chloride, PVC, polypropylene, PP, or polyethylene, PE, may be combined with a mix of wood fibres and mineral particles and this may provide a wide variety of floor panels with different densities and flexibilities.

Moisture resistant HDF with a high resin content, LVT floors and WPC floors comprise stronger and more flexible core materials than conventional HDF based laminate floors and they are generally produced with a lower thickness.

A minimum thickness in several of the above mentioned floor types are mainly required in order to form the locking system. The panel itself is generally strong and flexible and a thickness of about 3-5 mm would in many applications be sufficient but cannot be used since it is not possible to form strong locking systems in such thin floors.

The above mentioned floor types comprise different core materials with different flexibility, density and strengths. Locking systems must be adapted to such different material properties in order to provide a strong and cost efficient locking function.

DEFINITION OF SOME TERMS

In the following text, the visible surface of the installed floor panel is called "front side" or "floor surface", while the opposite side of the floor panel, facing the sub floor, is called "rear side". The edge between the front and rear side is called "joint edge". By "horizontal plane" is meant a plane, which extends parallel to the front side. Immediately juxtaposed upper parts of two adjacent joint edges of two joined floor panels together define a "vertical plane" perpendicular to the horizontal plane. By "vertical locking" is meant locking parallel to the vertical plane. By "horizontal locking" is meant locking parallel to the horizontal plane.

By "up" is meant towards the front side, by "down" towards the rear side, by "inwardly" mainly horizontally towards an inner and centre part of the panel and by "outwardly" mainly horizontally away from the centre part of the panel.

RELATED ART AND PROBLEMS THEREOF

For mechanical joining of long edges as well as short edges in the vertical and horizontal direction perpendicular to the edges several methods may be used. One of the most used methods is the angle-snap method. The long edges are installed by angling. The short edges are locked by horizontal snapping. The vertical connection is generally a tongue and a groove and the horizontal connection is a strip with a locking element in on edge that cooperates with a locking groove in the adjacent edge. Snapping is obtained with a flexible strip.

Similar locking systems may also be produced with a rigid strip and they are connected with an angling-angling method where both short and long edges are angled into a locked position.

Advanced so-called "fold down locking systems" with a separate and flexible tongue on the short edges have been introduced where both the long and short edges are locked with a single angling action. A floor panel of this type is presented in WO 2006/043893. It discloses a floor panel with a short edge locking system comprising a locking element cooperating with a locking groove, for horizontal locking, and a flexible bow shaped so called "banana tongue" cooperating with a tongue groove, for locking in a vertical direction. The flexible bow shaped tongue is inserted during production into a displacement groove formed at the edge. The tongue bends horizontally along the edge during connection and makes it possible to install the panels by vertical movement. Long edges are connected with angling and a vertical scissor movement caused by the same angling action connects short edges. Such a locking is generally referred to as "vertical folding".

Similar floor panels are further described in WO 2007/015669. This document provides a fold down locking system with an improved flexible tongue so called "bristle tongue" comprising a straight outer tongue edge over substantially the whole length of the tongue. An inner part of the tongue comprises bendable protrusions extending horizontally along the tongue edge.

WO 2013/151493 describes a locking system having a tongue that is formed of the material of panel edge and is inserted into a groove in order to form a fold down locking system. It is not described how the tongue should be formed in order to obtain sufficient flexibility and how it should be and inserted into a groove in a cost efficient way.

The separate flexible tongue is a vital part of the fold down locking system. It would be an advantage if the flexible and separate tongue could be produced and inserted into the edge in a more cost efficient way. It would also be an advantage if the width and thickness of the tongue could be reduced such that a fold down locking system may be formed in very thin floor panels.

SUMMARY OF THE INVENTION AND OBJECTS THEREOF

An objective of embodiments of the present invention is to provide an improved and more cost efficient fold down locking system comprising a flexible tongue for primarily adjacent short edges of thin floor panels.

A first specific objective is to provide a separate flexible tongue that is more compact and cost efficient than known tongues and that is suitable for locking thin panels.

A second specific objective is to provide a locking system with a flexible and bendable tongue that may be formed as a simple, straight and rod shaped component.

A third specific objective is to provide a cost efficient method to form an advanced flexible tongue from a core material of a floor panel and to insert the tongue after forming into a groove of the panel, preferably in the same production line.

The above objects, individually or collectively, of the invention may be achieved by embodiments of the invention.

According to a first aspect of the invention a set of essentially identical floor panels is provided with a mechanical locking system comprising a flexible tongue, which is arranged in a displacement groove at a first edge of a first panel and a tongue groove at a second edge of an adjacent second panel. The flexible tongue is configured to cooperate with the tongue groove for locking of the first and the second edge in a vertical direction. The mechanical locking system further comprises a locking strip at the first or the second edge, provided with a locking element configured to cooperate with a locking groove at the other of the first or second edge for locking in a horizontal direction. The flexible tongue is displaceable in the horizontal direction in the displacement groove. An outer part of the flexible tongue comprises two or more curved edge sections each comprising a sliding surface, which is configured to cooperate with the second edge during locking, and a locking surface that is configured to lock into and/or against the tongue groove. The tongue sections are spaced from each other in a length direction of the flexible tongue that is curved in a locked and in an unlocked position. A first horizontal distance, from an outer upper edge of the first edge to an outer edge of the flexible tongue, and a second horizontal distance, from the outer upper edge of the first edge to an inner edge of the flexible tongue, varies along a length of the flexible tongue. The tongue sections are configured to be pressed inwardly during locking by the second edge such that the curved sections are at least partially straightened and deformed to essentially straight rod shaped sections with a width, which is essentially the same along essentially the entire length of the flexible tongue and to move back towards their initial positions in a final stage of the locking such that the locking surfaces are inserted into the tongue groove.

The curved sections may be straightened and deformed to essentially straight rod shaped sections with a width, which is essentially the same along essentially the entire length of the flexible tongue.

The tongue sections may be configured to spring back towards their initial positions in a final stage of the locking such that the locking surfaces are inserted into the tongue groove.

Here and in the following, the wording "second panel edge" will be used interchangeably with the wording "second edge" or "adjacent edge", unless stated otherwise.

By "essentially straight" is here meant that the curved section has been at least partly straightened towards a straight section. By way of example, the curved section may be straightened to a completely straight section. A first curved section may be straightened towards a straight section by being straightened to a second curved section, wherein the first and second curved sections have a convex or concave outer edge along the length direction of the first and second curved section. During the straightening, an outer edge point of the convex or concave outer edge of the first curved section moves towards the displacement groove, wherein the outer edge point is a point on the first curved section that is farthest away from the displacement groove. Thereby, the outer edge point of the first curved section moves to an outer edge point of the second curved section that consequently is closer to the displacement groove, wherein the outer edge point now is a point on the second curved section that is farthest away from the displacement groove.

In the final stage of the locking, the tongue sections moves back towards their initial positions. In a first example, the tongue sections partly move back to their initial positions. In a second example, the tongue sections move back completely to their initial positions. In a third example, some tongue sections move back completely to their initial positions and some tongue sections move back partly to their initial positions.

The tongue sections may move back towards their initial positions by springing back.

The sliding surface may have a shape that essentially corresponds to a shape of a portion of a lower wall of the tongue groove. Moreover, the locking surface may have a shape that essentially corresponds to a shape of a portion of an upper wall of the tongue groove.

Preferably, the flexible tongue is freely arranged in the displacement groove. Thereby, no part of the flexible tongue is attached to the panel, e.g., by an adhesive or a friction connection.

Alternatively, however, one or more parts of the flexible tongue may be attached to the panel. For example, a first longitudinal end portion and/or a second longitudinal end portion of the flexible tongue may be attached to the displacement groove. The attachment of the tongue may be provided by means of an adhesive, a clip, or by means of inserting it into a slot provided in the panel, such as in the displacement groove.

The tongue may be attached to the panel by means of a friction connection. The friction connection may be provided at one or more upper and/or lower parts of the tongue along a length direction of the tongue.

In a first example, the curved edge sections are essentially identical. In a second example, the curved edge sections are different.

The flexible tongue may comprise a plastic material. The plastic material may be a thermoplastic material or a thermosetting plastic material. In particular, the plastic material may be a cross-linked thermoplastic, such as cross-linked PE. By "cross-linked thermoplastic" is here meant that at least a portion of the thermoplastic material comprises cross-links.

The sliding surface may be an inclined surface. The sliding surface may be essentially planar. The sliding surface may be directed upwards. According to one embodiment, the sliding surface forms an angle between 0° and 60° with respect to the vertical plane.

The locking surface may be an inclined surface. The locking surface may be essentially planar. The locking surface may be directed downwards. According to one embodiment, the locking surface forms an angle between 0° and 60° with respect to the vertical plane.

The width of the flexible tongue may be essentially the same over 90% of the length of the flexible tongue. By "essentially the same" for a measurement is meant within ±10% of other.

The flexible tongue may comprise tongue sections with cross sections such that the first horizontal distance is essentially the same as the second horizontal distance.

A major part of the flexible tongue may comprise cross sections with a horizontal width and a vertical thickness that are essentially the same. By "major part" is meant at least 50% of a length of the tongue. In examples, the major part may be 70%, 80% or 90% of the length of the tongue. In a specific example, the major part may be an entire length of the tongue.

The vertical thickness of the flexible tongue may be less than about 1.5 mm.

A curved tongue with a simple cross section and a straight rod shaped geometry in the inner position provides several advantages that may be used to design a very compact flexible tongue suitable for locking of thin floor panels. By a thin floor panel is here meant that a thickness of the panel is between 6 and 10 mm. A very thin floor panel has a thickness below 6 mm, for example 3, 4 or 5 mm.

According to a second aspect of the invention a set of essentially identical floor panels is provided with a mechanical locking system comprising a flexible tongue, which is arranged in a displacement groove at a first edge of a first panel, and a tongue groove at a second edge of an adjacent second panel. The flexible tongue is configured to cooperate with the tongue groove for locking of the first and the second edge in a vertical direction. The flexible tongue comprises a sliding surface and a locking surface. The displacement groove comprises a cavity comprising upper, inner and lower cavity walls and a horizontal opening. The second floor panel comprises a protrusion comprising a sliding edge, which is configured to cooperate with the sliding surface during locking and to press and bend a flexible tongue section into the cavity. The flexible tongue section is configured to move back outwardly such that the locking surface is inserted into the tongue groove.

The tongue sections may move back towards their initial positions by springing back.

The inner cavity wall may be a curved surface or a planar surface. The upper, inner and lower cavity walls may start and end in the displacement groove along a length direction thereof. The upper, inner and lower cavity walls may be continuous upper, inner and lower cavity walls, whereby the walls are smooth and connected to the displacement groove by means of a smooth transition, without any disruptions. The continuous walls may be formed by means of a rotating carving or jumping tool.

The flexible tongue may be straight. Thereby, a simple and cost-effective tongue is provided. Alternatively, however, the tongue may be curved.

The cross-section of the tongue may be constant along its length direction.

In a first example, the tongue section moves back partly to an initial shape of the tongue section. In a second example, the tongue section moves back completely to the initial shape of the tongue section.

The locking system may comprise two or more cavities and protrusions.

The mechanical locking system may comprise a locking strip, at the first or the second edge, provided with a locking element configured to cooperate with a locking groove at the other of the first or second edge for locking in a horizontal direction.

According to a third aspect of the invention a set of essentially identical floor panels is provided with a mechanical locking system comprising a flexible tongue, which is arranged in a displacement groove at a first edge of a first panel, and a tongue groove at a second edge of an adjacent second panel. The flexible tongue is configured to cooperate with the tongue groove for locking of the first and the second edge in a vertical direction. An outer part of the flexible tongue comprises a protrusion comprising a sliding surface and a locking surface. The displacement groove comprises a cavity comprising upper, inner and lower cavity walls and a horizontal opening. The second floor panel comprises a sliding edge, which is configured to cooperate with the sliding surface during locking and to press and bend a flexible tongue section into the cavity. The flexible tongue section is configured to move back outwardly such that the locking surface is inserted into the tongue groove.

The upper, inner and lower cavity walls may be continuous upper, inner and lower cavity walls.

The tongue sections may move back towards their initial positions by springing back.

The locking system may comprise two or more cavities and protrusions.

The mechanical locking system may comprise a locking strip at the first or the second edge, provided with a locking element configured to cooperate with a locking groove at the other of the first or second edge for locking in a horizontal direction.

The cavities offer the advantages that the tongue may be formed as a very simple essential straight rod shaped component with a compact geometry suitable for locking of thin floor panels.

According to a fourth aspect of the invention a method for producing a locking system at edges of building panels comprising a core is provided. The method comprises the steps of forming a strip at a lower part of a first edge and a locking element at an outer part of the protruding strip.

forming a tongue from the core at an outer part of the first edge;

forming an insertion groove at the first edge, wherein said insertion groove is sidewardly open and extends in the horizontal direction;

displacing the tongue (10) at least partly into the insertion groove with a vertical and horizontal displacement, and forming a tongue groove and a locking grove at a second adjacent edge.

The tongue is configured to cooperate with the tongue groove for vertical locking and the locking element is configured to cooperate with the locking groove for horizontal locking.

The method may comprise the step of forming the tongue at the outer and lower part of the first edge.

The method may comprise the step of forming the tongue with a lower part and an upper part, wherein the lower and the upper part is vertically and horizontally offset in relation to each other.

The method may comprise the step of displacing the tongue with rotating wheels.

This production method offers the advantages that the tongue may be formed from the core material of the floor panel and no additional separate material is needed to produce a flexible tongue that always will have a suitable length that corresponds to the short edge of a panel.

According to a fifth aspect of the invention a set of essentially identical floor panels is provided with a mechanical locking system comprising a flexible tongue, which is arranged in a displacement groove at a first edge of a first panel and a tongue groove at a second edge of an adjacent second panel. The flexible tongue is configured to cooperate with the tongue groove for locking of the first and the second edge in a vertical direction, wherein the mechanical locking system further comprises a locking strip at the first or the second edge provided with a locking element configured to cooperate with a locking groove at the other of the first or second edge for locking in a horizontal direction. The flexible tongue comprises a lower part and an upper part. The lower and the upper part are vertically and horizontally offset in relation to each other and the lower part comprises a lower protrusion extending vertically downwards.

The lower part may comprise at least two lower protrusions along its length.

The lower part may comprise at least two inner protrusions extending horizontally inwardly and being spaced from each other along the displaceable tongue.

A tongue with offset upper and lower parts offers the advantages that protrusions and cavities may be formed on the tongue in a cost efficient way when the tongue is formed in line from the same core material that is used to form the locking system.

It is emphasized that all embodiments disclosed above may be partly or completely combined with each other.

BRIEF DESCRIPTION OF THE DRAWINGS

The disclosure will in the following be described in connection to exemplary embodiments and in greater detail with reference to the appended exemplary drawings, wherein:

FIGS. 1a-e illustrate a fold down locking systems according to known principles.

FIGS. 2a-f illustrate embodiments of production methods which may be used to form grooves and cavities.

FIGS. 3a-f illustrate bending of a flexible tongue according to an embodiment.

FIGS. 4a-f illustrate forming of a flexible tongue from an extruded tongue blank or a sheet material according to an embodiment of the invention.

FIGS. 5a-f illustrate a locking system comprising cavities and protrusions provided in panels according to an embodiment.

DESCRIPTION OF EMBODIMENTS OF THE INVENTION

Figure 6A:
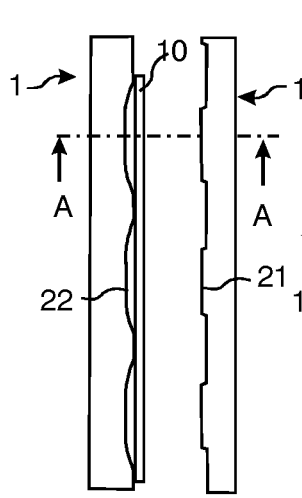
FIGS. 6a-i illustrate displacement and bending of a rod shaped separate tongue according to an embodiment.
Figure 6B:
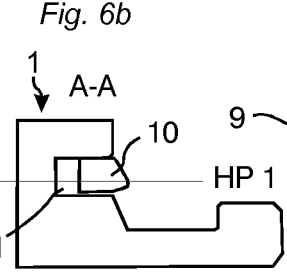
Figure 6C:
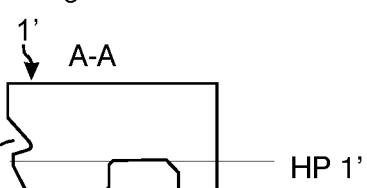

FIGS. 1a-1e show flexible tongues 10 and locking of a first 1 and a second 1' panel edge with vertical displacement according to known principles. A flexible bristle tongue 10 comprising a tongue body 20 and flexible protrusions 21 at its inner part as shown in FIG. 1b, or at its outer part as shown in FIG. 1c, is displaced inwardly into a displacement groove 11 during locking as shown in FIG. 1a and outwardly during the final stage of the locking such that the outer parts of the flexible tongue 10 are inserted into a tongue groove 9 and the adjacent edges of the first 1 and the second 1' panel are locked vertically parallel to a vertical plane VP. The panel edges comprise a strip 6 with a locking element 8 in one of the edges that cooperates with a locking groove 14 formed in the adjacent edge and locks the edges in a horizontal direction parallel to the panel surface and perpendicularly to the vertical plane.

FIG. 1b shows a bristle tongue 10 with a tongue body 20 and flexible protrusions 21 at its inner part. FIG. 1c shows a bristle tongue 10 with a tongue body 20 and flexible protrusions 21 at its outer part.

The flexible tongue has a length direction L along the edge, a width W extending horizontally perpendicular to the edge, and a tongue thickness TT in the vertical direction. The tongue thickness TT is generally the same as the groove thickness GT of the displacement groove 11. The maximum width W is larger than the groove depth GD of the displacement groove 11.

The flexible tongue comprises a complex geometry and is therefore formed as an injected moulded thermoplastic-based component comprising glass fibres that are used to accomplish high strength combined with flexibility. A bending of the protrusions in the length direction of the tongue is an essential feature of such advanced flexible tongues.

FIGS. 1d and 1e show that the flexible tongue 10 is produced and delivered as a tongue blanks 30 comprising for example 8-32 tongues. Plastic material is injected into a tool through injection channels 31, generally from one side only in order to reduce production costs. The channel material is removed after the injection forming and may be re-melted and used again.

Injection moulding with thermoplastic material comprising glass fibres is a cost efficient method that provides high quality components with very low production tolerances. However, the production method and the geometry of the flexible tongue has several disadvantages that limits the possibilities to produce cost efficient locking systems comprising a flexible tongues in new type of floor panels and core materials where a fold down installation is desirable.

One disadvantage is that a flexible tongue must have a length L that corresponds to the width of the panel since it is inserted into a groove formed at the short edge.

Plastic material must flow through a tongue body 20 along the length L of the tongue 10 and there must be a space S between the protrusions 21 and the tongue body 20, see FIGS. 1d and 1e. This provides certain cost related limits to the geometry of the tongue. For example, the production time and the tool cost may increase considerably if the width W is lower than 4 mm, the thickness 7 is lower than 1.5 mm and the length exceeds about 300 mm.

Another problem is that it is difficult to form a displacement groove with a groove thickness GT that is smaller than about 1.5 mm if the groove depth GD is about 4 mm.

Mechanical locking systems are generally formed with large rotation tools that form grooves and protruding parts parallel to an edge and along the whole edge.

FIGS. 2a-2e show embodiments of production methods that may be used to form locking systems and tongues comprising cavities 22 and protrusions 21 arranged perpendicularly to an edge 1 according to an aspect of the invention.

FIG. 2a is a top view showing a tool comprising rotating saw blades 40 that are displaced against a panel edge 1 and back again. Alternatively, the panel 1 may be displaced against the saw blades 40 and back again. This production method may be used to form cavities 22 or protrusions 21 as shown in FIGS. 2b and 2c, wherein the upper figures illustrate perspective views and the lower figures illustrate top views of the panel edge 1.

FIG. 2d shows a side view of a so-called rotating jumping tool head 41 that may be displaced vertically or horizontally against a moving panel edge 1. Thereby, local cavities 22 may be formed.

FIG. 2e shows a cost efficient method to form cavities 22 with a rotating carving tool 45. The carving tool 45 comprises teeth 46 which are arranged along an outer edge of the carving tool 45. The tool rotation speed is synchronized with the displacement of the panel 1 and each tooth 46 forms one cavity 22 at a predetermined position and with a predetermined horizontal extension along an edge of a panel 1. It is not necessary to displace the tool vertically. A carving tool 45 may have several sets of teeth 46 and each set may be used to form one cavity. The cavities 22 may have different cross sections depending on the geometry of the teeth 46.

FIG. 2f shows a top view of a so-called screw cutter 42. This is an advanced production technology that allows high precision and cost efficient forming of protrusions and cavities perpendicular to an edge that is displaced in a high speed against the screw cutter 42. WO 2010/087752 provides a detailed description of the screw cutter principle.

FIG. 3a shows a flexible tongue 10 according to an embodiment. A width W of the flexible tongue 10 is essentially the same over substantially the whole length L of the flexible tongue 10.

FIGS. 3b and 3c show an enlarged picture of a tongue portion Ts1 shown in FIG. 3a and a cross section A-A of the flexible tongue 10 inserted in a displacement groove 11 provided in the panel edge 1.

FIG. 3b shows the flexible tongue 10 in an unlocked and in a locked position. The unlocked position is illustrated by the upper panel edge 1' which is indicated by an unbroken line while the locked position is illustrated by the lower panel edge 1' which is indicated by a broken line. The flexible tongue 10 is inserted in a displacement groove 11 comprising an upper lip 12. A vertical plane VP intersects the upper and outer part of the upper lip 12. The tongue comprises at least two tongue sections Ts1, Ts2, each comprising a sliding surface 15, that during locking cooperates with a sliding edge 17 of the adjacent edge 1', and a locking surface 16 that locks into the tongue groove 9. According to the present embodiment, the sliding surface 15 is provided in an upper part of the flexible tongue 10. More specifically, the sliding surface 15 is an outer and upper inclined part of the flexible tongue 10. Moreover, according to the present embodiment, the locking surface 16 is provided in a lower part of the flexible tongue 10. More specifically, the locking surface 16 is an outer and lower inclined part of the flexible tongue 10. The sliding surface 15 is arranged above the locking surface 16. The tongue sections Ts1, Ts2 are spaced from each other in the length direction L of the flexible tongue 10. The tongue is curved in a locked and in an unlocked position such that a first horizontal distance D1 from the vertical plane VP and to the outer part of the flexible tongue 10 and a second horizontal distance D2 from the vertical plane VP to an inner part of the flexible tongue 10 varies along the length L of the tongue.

The shape of the flexible tongue 10 may be further defined by a third horizontal distance D3 from the inner part of the tongue to an inner horizontal line connecting the innermost points of the tongue. The inner line is essentially parallel with a length direction of the flexible tongue 10. The inner line is a straight line if each of the tongue sections Ts1, Ts2, . . . have the same shape. In a first example, D1 corresponds to D3 along the entire length direction of the flexible tongue 10, thereby providing a constant width W of the flexible tongue 10. In a second example, D1 differs from D3 at least along a portion of the length direction of the flexible tongue 10, thereby providing a varying width W.

It is clear that the illustrated embodiments of the present application are non-limiting with regard to the number of tongue sections. Indeed, there may be one or more tongue sections Ts1, Ts2, . . . , TsN, where N is an arbitrary integer larger than or equal to one, i.e. N=1, 2, 3, 4, . . . .

FIG. 3c shows the flexible tongue 10 in an inner position during locking. According to the present embodiment, the adjacent edge 1' is displaced essentially vertically downwards towards the first panel edge 1 during locking, such that the locking groove 14 provided in the adjacent edge 1' is lowered towards and cooperates with the locking element 8 provided in the first panel edge 1. The flexible tongue 10 is pressed inwardly by the sliding edge 17 of the adjacent panel 1' and the curved sections Ts1, Ts2 are straightened such that the flexible tongue 10 is formed to an essentially straight rod shaped component with a tongue width W that is essentially the same along the major part of the flexible tongue. In an embodiment, during locking of a tongue section, the distance D3 may change from an unlocked distance to less than 20% of the unlocked distance. It is noted that the sliding surface 15, which protrudes outwardly beyond the vertical plane VP in a locked position as well as in an unlocked position, as illustrated in FIG. 3b, is pressed towards the displacement groove 11 during locking as illustrated in FIG. 3c. Thereby, the sliding surface 15 may be pressed inwardly of the vertical plane VP during locking—partly or entirely.

As shown in FIG. 3b the flexible tongue 10 comprises inner protrusions 21a and outer protrusions 21b arranged along a length direction of the tongue at an inner part and an outer part of the tongue, respectively. In FIG. 3b it may be seen that the tongue section Ts1 comprising an outer protrusion 21b has been straightened to an essentially straight section.

FIG. 3d shows an embodiment according to which the panels comprise short edges 1, 1' and long edges 4. A scissor movement of the adjacent short edge 1' caused by the angling of the long edge 4 of the panel will gradually press the tongue sections inwardly along the panel edge and deform the flexible tongue 10 towards an essentially straight component. For example, at least one tongue section of the flexible tongue 10, which has a convex or concave outer edge along the length direction of the tongue section, may become straightened so that an outer edge point of the convex or concave outer edge moves towards the displacement groove 11, wherein the outer edge point is a point on the tongue section farthest away from the displacement groove 11. In FIG. 3b the outer edge point is located in a centre portion of the convex tongue section Ts1 along its length direction where a distance XM to the inner wall of the displacement groove 11 is maximal. It is noted that in a concave tongue section Ts0, as shown in FIG. 3b, the outer edge point may be located in an edge portion of the concave tongue section along its length direction where a distance to the inner wall of the displacement groove 11 is maximal. By way of example, the outer edge point may move towards the displacement groove 11 at least by a distance corresponding to 20-60% of a maximal width of the tongue 10, preferably 40-50%. In particular, the flexible tongue 10 may be straightened to an essentially straight component, for example a straight component along its entire length. Preferably, the outer parts of the flexible tongue 10 and the tongue groove 9 are configured such that an inner part of the edge 1a and a first tongue portion Ts1 is located close to its final locked position, as shown in FIG. 3e, when an outer part of the edge 1b and a second tongue portion Ts2, preferably a tongue portion that is most distant to the first tongue portion Ts1, is located in its inner position as shown in FIG. 3f. The edge sections Ts1, Ts2 will gradually move into the tongue groove 9 during the vertical folding and locking resistance and separation forces, that may press the short edges away from each other due to the bending of the tongue, will be reduced. This facilitates an easy locking.

The flexible tongue 10 may comprise friction connections 23, preferably located at an upper and/or a lower part of tongue. The friction connections 23 may be elongated. The required flexibility is mainly obtained by a curved tongue body 20 of the tongue that during locking bends mainly horizontally and inwardly into the displacement groove 11.

The flexible tongue 10 may comprise tongue portions with cross sections wherein the first horizontal distance D1 is essentially the same as the second horizontal distance D2 such that the tongue width W may be about 2 times the width of the sliding surface 15 that protrudes beyond the vertical plane VP. The flexible tongue 10 may be formed with a very compact cross section such that the tongue width W is essentially the same as the tongue thickness TT.

The described embodiment offers several advantages. The straight inner position makes it possible to form displacement grooves with a very small depth. The simple geometry of the tongue allows a cost efficient production since plastic material may float easily during the injection moulding and this makes it possible to decrease the tongue width W and the tongue thickness TT and to increase the tongue length L. It is possible to produce an injection-moulded tongue with a thickness TT that is less than 1.5 mm, for example with a thickness of about 1.0-1.5 mm and with a width W of about 1.5-3 mm. It is also possible to produce extremely thin flexible tongues with a tongue thickness TT of 0.5-1.0 mm. Such tongues may be used to lock very thin floor panels, for example LVT or WPC floor panels with a thickness of about 3 mm.

A stiffness of the flexible tongue may be specified by a transverse spring constant. According to a non-limiting example, the transverse spring constant of the flexible tongue is between 5-50 N/mm per 100 mm length of the tongue. According to another non-limiting example, the transverse spring constant is between 15-25 N/mm per 100 mm length of the tongue. The transverse spring constant of the flexible tongue may be tested by standard methods known to a person skilled in the art.

FIG. 4a illustrates a top view and a cross-sectional view of a tongue blank 30 according to an embodiment. FIGS. 4a-4b show that the flexible tongue 10 may be formed from a tongue blank 30 that is an extruded plastic or metal component comprising an identical cross section along the whole length of the tongue blank. In particular, the tongue blank 30 has a constant width along its length direction. A punching wheel 43 may form curved parts of the flexible tongue 10. The curved parts are formed by removing material from the tongue blank 30. According to the present embodiment, material is removed from an inner part and from an outer part of the tongue blank 30 in such a way that a width of the resulting flexible tongue 10 becomes essentially constant along a length direction of the flexible tongue 10. The flexible tongue 10 may have friction connections 23 protruding vertically upward or downward. This is illustrated in the top view of the flexible tongue 10 according to the embodiment in FIG. 4b.

According to an alternative embodiment, material may be removed from an inner part and/or from an outer part of the tongue blank 30 in such a way that the width of the resulting flexible tongue 10 becomes non-constant along the length direction of the flexible tongue 10. Examples of flexible tongues 10 having non-constant widths will be described further below in relation to the embodiments in FIGS. 9b, 9c and 12c.

According to alternative embodiments, the curved parts of the flexible tongue 10 may be formed by other means, such as cutting, carving, punching or milling, or any combination of these means.

The tongue blank 30 and/or the flexible tongue 10 may be formed by means of injection moulding, extrusion, 3D printing by forming successive layers, or pultrusion with a reinforcement material.

Generally, the tongue blank 30 and/or the flexible tongue 10 may comprise at least one material chosen from the group consisting of a plastic, such as a thermoplastic or a thermosetting plastic, a WPC, a metal, or a panel material, such as a panel core material or material from at least one layer of a panel. The material may further comprise a reinforcement material. Thereby, the material may become more rigid. For example, the reinforcement material may comprise fibres or resins, such as thermosetting resins. Alternatively, or additionally, the material may comprise a cross-linked material, such as a plastic with cross-linked polymers.

The thermoplastic may comprise PVC, PE, PP, CPVC, or similar materials. In non-limiting examples the polyethylene may be a low-density PE, a linear low-density PE, a medium-density PE or a high-density PE. In particular, the thermoplastic may be a cross-linked thermoplastic, such as cross-linked polyethylene, also called PEX or XLPE. Moreover, the thermoplastic may be a reinforced thermoplastic. The reinforced thermoplastic may comprise a reinforcement material, such as fibres. The fibres may comprise at least one of glass fibres, carbon fibres, aramid fibres, wood fibres, basalt fibres, non-woven fibres, or textile fibres. Alternatively, the fibres may comprise metal fibres, such as magnetic metal fibres, e.g. iron or a magnetic alloy. Thereby, the fibres may be separated from the plastic more easily during recycling. The fibres may have a specific orientation. For example, the fibres may be oriented along a length direction of the flexible tongue 10. Alternatively, the fibres may be randomly oriented. The fibres may be randomly distributed in the flexible tongue 10. Alternatively, the fibres may be arranged in the form of a mat-shaped layer in the flexible tongue 10, such as a fabric, for example in a centre portion of the flexible tongue 10.

Thus, the flexible tongue 10 preferably comprises a low-creep material that does not creep or deform to any considerable extent over time. Thereby, the locking function does not deteriorate over time, for example after 1 month, 1 year, or 10 years. The reinforced and the cross-linked materials described above may both counteract creeping. FIGS. 4d-4f show that tongues blanks 30 may be formed from a sheet shaped material 50. The sheet shaped material 50, which is illustrated in FIG. 4d in the case of a single-layer sheet, may be a thermoplastic material, preferably comprising mineral or wood fillers. Preferably at least three layers are laminated or fused together. Glass fibres or any other fibres described above may be used to reinforce the sheet shaped material. The sheet shaped material may also comprise thermosetting resins preferably mixed with wood fibres. FIG. 4f shows a sheet shaped material 50 comprising at least three layers. The upper 51a and the lower 51c layers comprise thermoplastic material and the middle layer 51b is a reinforcement layer comprising fibres, for example glass fibres. The middle layer 51b is a mat-shaped layer comprising fibres. It is clear, however, that other materials described above may be used for the layers 51a-c. For example, the upper 51a and the lower 51c layers may comprise a thermosetting plastic and/or the middle layer 51b may comprise randomly distributed fibres. According to the embodiment in FIG. 4e, the flexible tongue 10 comprises at least three layers of materials with different material properties. The layers and reinforcement layers may be joined to each other by means of heating and/or pressing. Hot embossed rollers may be used to form straight 52a or curved 52b sheet grooves in the sheet shaped material 50 that after separation form outer and/or inner parts of a flexible tongue 10. The grooves may also be formed with rotating cutting or carving tools. A punching tool 43, or punching wheel 43, may also be used to form the flexible tongues 10. All these production methods may be combined. Flexible tongues 10 may also be formed with conventional 3D-printing methods. In relation to FIGS. 4d-f, three layers have been chosen for illustrative purposes only and it is clear that any number of layers may be chosen, for example 1, 2, 3, 4, 5, 6 or 7 layers. Additionally, there may be a plurality of reinforcement layers. For example, there may be a centre layer sandwiched between inner surfaces of a first and a second reinforcement layer, and an upper and lower layer arranged on outer surfaces of the first and second reinforcement layer, respectively.

FIG. 5a shows that the flexible tongue 10 may be formed as a straight rod shaped component. FIG. 5b shows that cavities 22a, 22b may be formed at the inner part of the displacement groove 11 of a first panel 1 and that protrusions 21 may be formed in the adjacent second panel 1'. The cavities 22a, 22b and the protrusions 21 are formed along portions of the side edges of the panels 1, 1' in their length direction. Each cavity comprises a continuous upper 26, inner 27, and lower 28 cavity wall and a horizontal cavity opening 29 towards the vertical plane VP. The cavity walls are preferably continuous along the edge since they are preferably formed with a rotating carving or jumping tool. At least a portion of the inner cavity wall 27 is curved. Each protrusion 21 comprises an upper horizontal wall and an outer wall. According to the present embodiment, the outer wall is inclined. According to an alternative embodiment, however, the outer wall may be vertical and the protrusion may also comprise a lower horizontal wall that is essentially parallel with the upper wall. The cavities 22a, 22b may have the same vertical extension as the displacement groove 11. Alternatively, the cavities 22a, 22b may have a larger vertical extension than the displacement groove 11. This provides a more cost efficient production since larger and more efficient jumping tools or saw blades may be used and production tolerances may be increased without negative effects on the locking function. According to an alternative embodiment, the cavities 22a, 22b may have a smaller vertical extension than the displacement groove 11.

FIG. 5c-5f show that the protrusions 21 and the cavities 22 are located along the panel edges and adjacent to each other such that a protrusion 21 may displace and bend a part of a tongue section Ts1 into the cavity 22. FIG. 5d shows a cross section A-A comprising a cavity 22a that has about the same vertical extension or cavity thickness Ct as the thickness GT of the displacement groove 11. FIG. 5e shows an alternative embodiment of the cross-section A-A wherein a cavity 22b has a larger cavity thickness than the displacement groove 11 and is offset vertically below the upper or lower parts of the displacement groove. The displaceable tongue 10 may have an outer portion with a larger outer tongue thickness TTa than a tongue thickness TTb of an inner portion. An advantage is that the inner part of the tongue may be displaced into a cavity even if the vertical position of the forming tool is not aligned with the upper part of the displacement groove 11. According to an alternative embodiment, the cavity 22b may have a smaller cavity thickness than the displacement groove 11. FIG. 5f shows a cross section B-B where no cavity and protrusion are formed and where essentially no displacement of the flexible tongue 10 in the displacement groove 11 takes place. This part of the edge is used as a support for the inward bending of the tongue section Ts1.

Figure 6D:
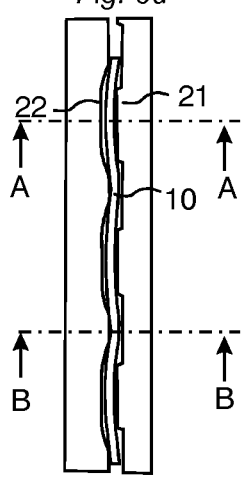
Figure 6E:
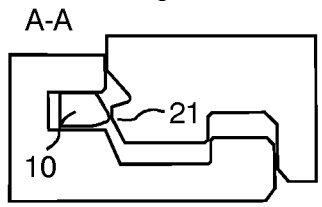
Figure 6F:
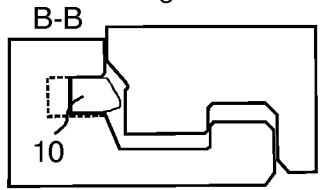
Figure 6G:
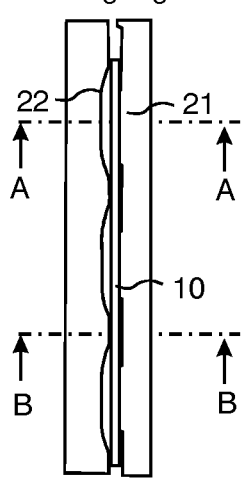
Figure 6H:
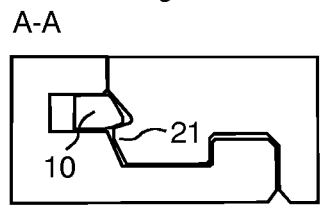
Figure 6I:
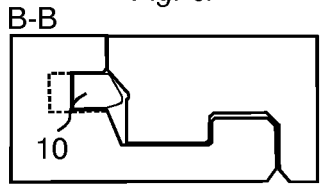

FIGS. 6a-6i show in detail the displacement of a flexible rod shaped tongue 10 according to FIGS. 5a-5f. FIG. 6a shows a top view of a first 1 and a second 1' edge section at horizontal planes HP 1 and HP 1' according to FIGS. 6b and 6c. Here, the tongue is essentially straight. FIGS. 6d-f show the flexible tongue 10 in a bended inner position wherein parts of the flexible tongue 10 has been pressed into the cavities 22 by means of the protrusions 21. FIGS. 6g-6i show the flexible tongue 10 in an outer and locked position wherein the tongue groove 9 and the displacement groove 11 are vertically aligned so that the outer parts of the flexible tongue 10 has been inserted into the tongue groove 9. According to the present embodiment, the flexible tongue 10 is essentially straight in the outer and locked position. According to an alternative embodiment (not shown), however, at least a portion of the flexible tongue 10 may be bended in the outer and locked position. For example, the flexible tongue 10 may be bended in sections.

Figure 7A:
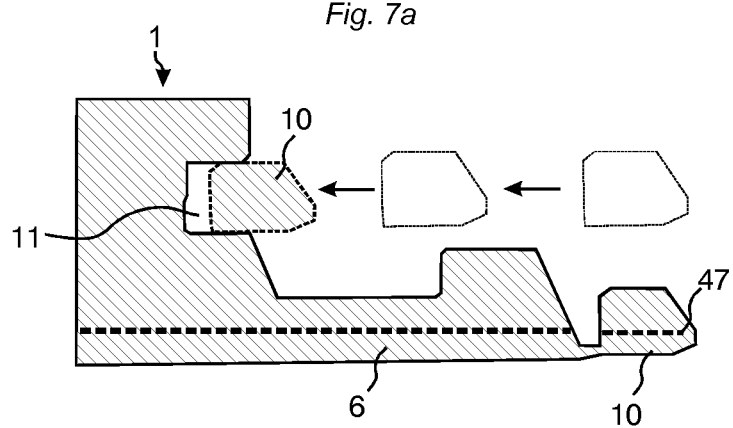
FIGS. 7a-b illustrate a method to separate and insert a flexible tongue into a groove according to an embodiment.
Figure 7B:
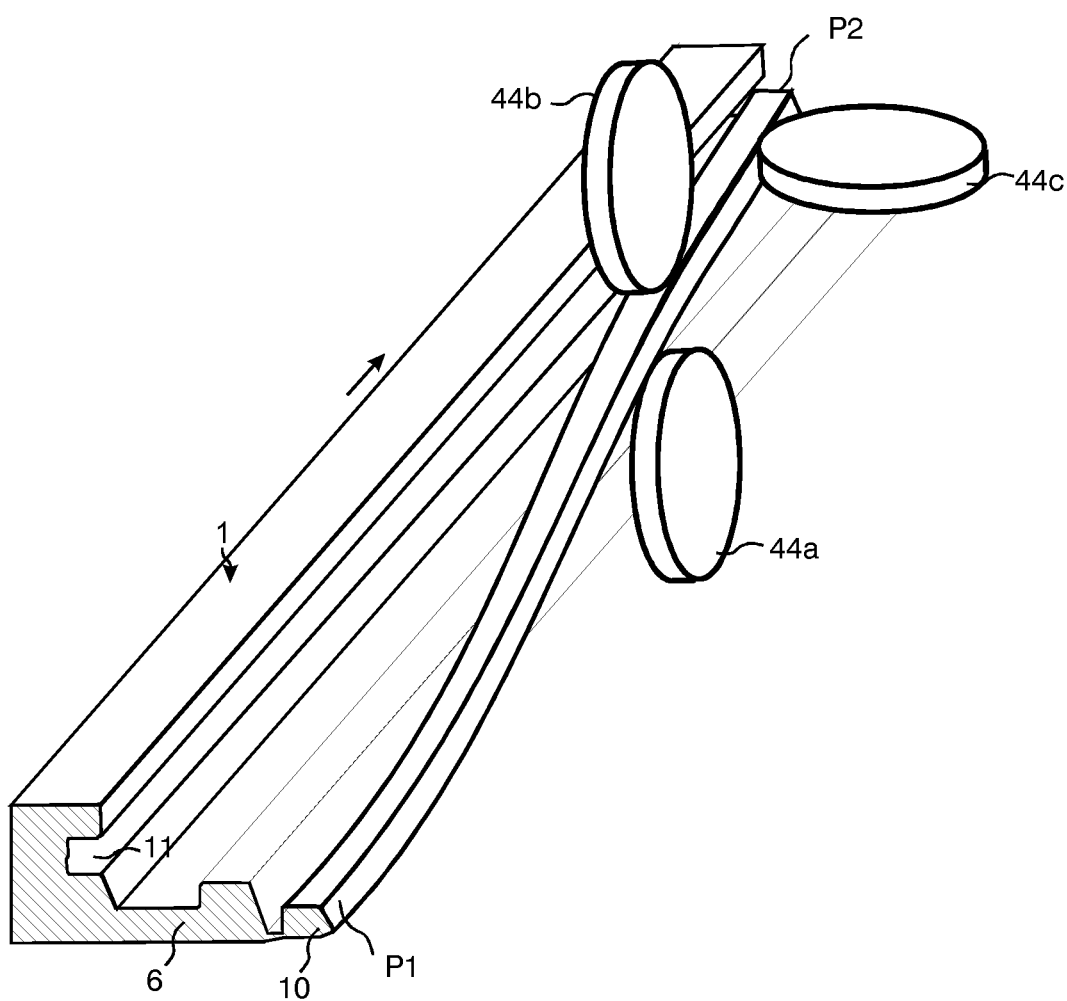

FIGS. 7a and 7b show a method to form a tongue, preferably a flexible tongue 10, from an edge part of a panel 1 and to insert the tongue into a groove, preferably a displacement groove 11, preferably in the same production line that is used to form the locking system. The flexible tongue 10 is in this embodiment formed at an outer part of the strip 6. Pressing wheels 44a, 44b and 44c may be used to separate the tongue 10 from the edge 1 and displace the tongue vertically and horizontally into the groove 11. It is preferred that a part P1 of the tongue is connected to the edge 1 when another part P2 is inserted and fixed into the groove 11. The tongue 10 may also be released from the edge 1 and displaced with the wheels 44a, 44b, preferably at the same speed as the panel edge 1, and inserted into the displacement groove 11 with wheels 44c or some pressing units. Upper and lower support units may be used to align and position the tongue into the groove. The tongue may be used in a locking system as described in FIGS. 5a-5f. Such production method offers several advantages. Tongue blanks are not needed and the tongue 10 will always have an appropriate length that corresponds to the panel edge. A wide variety of core materials have been introduced on the market, such as HDF, high density water resistant HDF comprising an increased resin content, thermoplastic material mixed with mineral or wood fibre fillers, so called LVT or WPC material, foamed thermoplastic material etc. Any of the above-mentioned materials may be used for forming the flexible tongue 10 according to the embodiment in FIGS. 7a-b. Thermoplastic floor materials are often reinforced with glass fibres in order to decrease thermal shrinking and expansion. Glass fibres 47 may be located in the part of the core 6 where the flexible tongue 10 is formed and may contribute to increase the strength and spring properties of the flexible tongue 10. Such materials have a sufficient flexibility and may provide a strong and flexible tongue body. Engineered wood floorings have generally a separate material such as plywood on the short side and this separate material may also be used to form the flexible tongue. Thermoplastic floor materials are often reinforced with glass fibres in order to decrease thermal shrinking and expansion. Such glass fibre layers are positioned in the middle parts of the core 6. Glass fibres 47 may be positioned in the part of the core 6, preferably the lower part, where the flexible tongue 10 is formed and may contribute to increase the strength and spring properties of the flexible tongue 10.

Figure 8A:
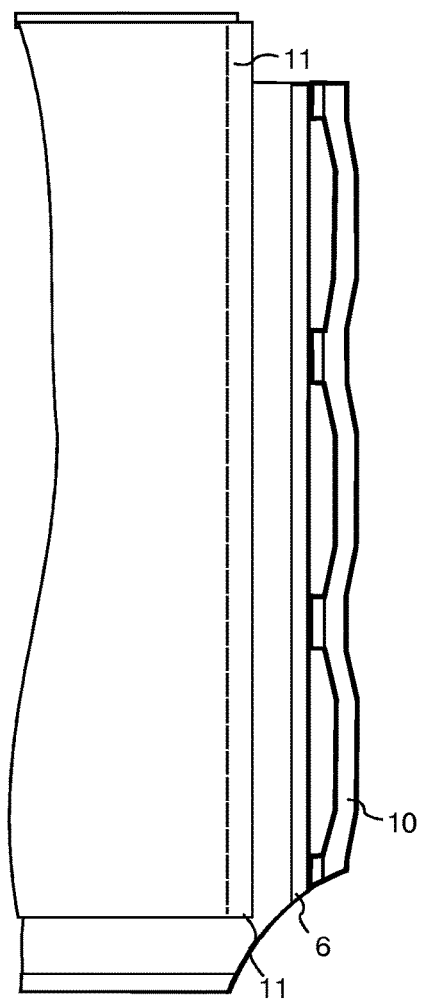
FIGS. 8a-c illustrate forming and insertion of a flexible tongue comprising protrusions according to an embodiment.
Figure 8B:
Figure 8C:
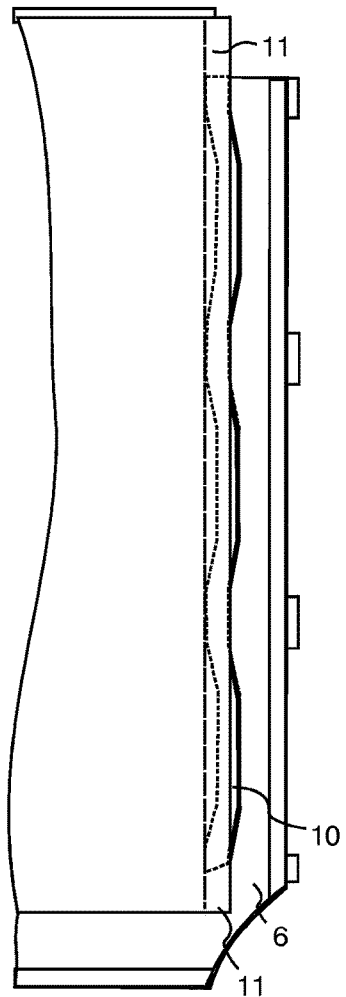

FIGS. 8a-8c show that rather complex curved tongues 10 may be formed with screw cutters, jumping tool heads or punching wheels and that cavities and protrusions formed in the panel edges are not needed to displace a flexible tongue 10 in a displacement groove 11. FIG. 8a shows a tongue 10 formed and connected to an outer part of a strip 6. FIG. 8b shows the flexible tongue 10 which is released from the strip 6 and FIG. 8c shows the displaceable tongue 10 inserted into a displacement groove 11.

By a curved tongue is meant that at least a section of the tongue is curved. The curved tongue may comprise any number of curved sections, for example, 3, 4, 5, 6, . . . . The curved sections may be directly connected to each other. Optionally, however, straight sections may connect the curved sections.

Figure 9A:
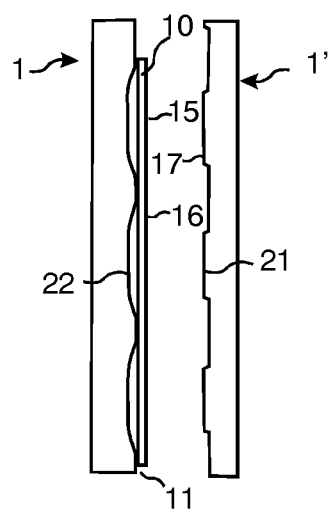
FIGS. 9a-d illustrate alternative methods to insert and bend a flexible tongue according to various embodiments.
Figure 9B:
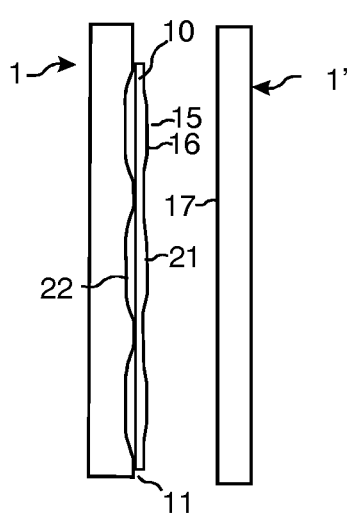
Figure 9C:
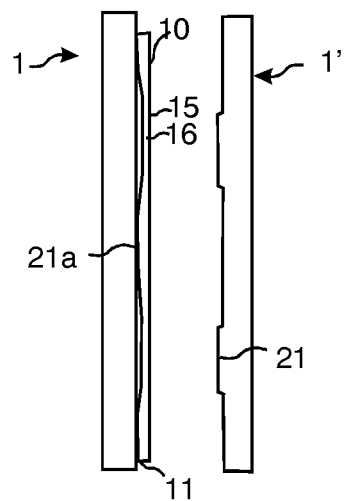
Figure 9D:
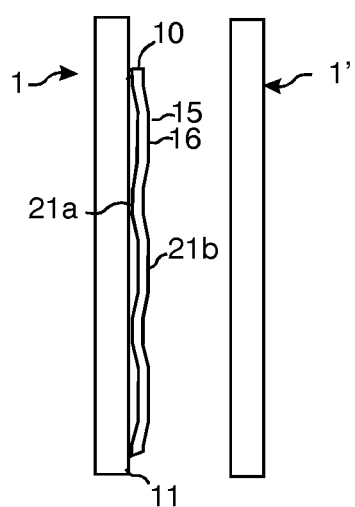

FIGS. 9a-9d show preferred embodiments of locking systems and the flexible tongues 10. FIG. 9a shows a straight rod shaped flexible tongue 10 comprising locking surfaces 16 and sliding surfaces 15 inserted in a displacement groove 11 of an panel edge 1 comprising cavities 22. FIG. 9a also shows an adjacent edge 1' comprising protrusions 21. FIG. 9b shows that the protrusions on the adjacent edge 1' may be replaced by outwardly extending protrusions 21 formed on the outer part of the flexible tongue 10. Such protrusions 21 are easy to form on a flexible tongue 10 produced by extrusions or produced from a sheet shaped material. Only a cost efficient rotating carving tool may be sufficient to form a high quality locking system. According to the embodiment in FIG. 9b, the flexible tongue 10 is insertable into the cavities 22 of the displacement groove 11 with the protrusions 21 facing away from the cavities 22. Thereby, an outer surface of the panel edge 1', such as the sliding edge 17, may contact the protrusions 21 and displace and bend a part of a tongue section of the flexible tongue 10 inwardly. FIG. 9c shows that the cavities 22 may be replaced with inner protrusions 21a formed on the inner part of the tongue 10. Thereby, the protrusions 21 on the panel edge 1' may displace and bend a part of a tongue section of the flexible tongue 10 inwardly. The displacement may occur between the inner protrusions 21a where there is a space between the tongue 10 and an inner wall of the displacement groove 11. In this embodiment, the inner wall is a planar surface, but other shapes are equally conceivable. FIG. 9d shows that both cavities and protrusions may be replaced with a curved flexible tongue 10 comprising inner protrusions 21a and outer protrusions 21b at the inner and outer parts of the flexible tongue 10, respectively. Thereby, the outer surface of the panel edge 1', such as the sliding edge 17, may contact the protrusions 21 and displace and bend a part of a tongue section of the flexible tongue 10 inwardly towards the inner wall of the displacement groove 11. In this embodiment, the inner wall is a planar surface, but other shapes are equally conceivable.

In non-limiting examples, the inner part and/or the outer part of the flexible tongue 10 may be shaped essentially as a part of a sine wave, a part of a saw-tooth wave, have a step-wise constant profile, or have a straight profile.

In all of the embodiments above and in the following, it is clear that each protrusion 21, 21a, 21b may be provided at a lower vertical portion, an upper vertical portion, or a centre portion of the flexible tongue 10.

Figure 10A:
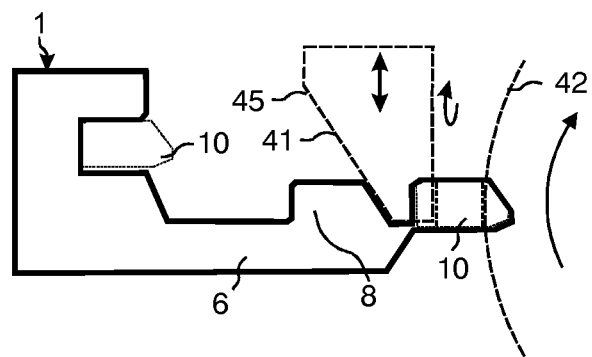
FIGS. 10a-c illustrate forming of a flexible tongue according to an embodiment.
Figure 10B:
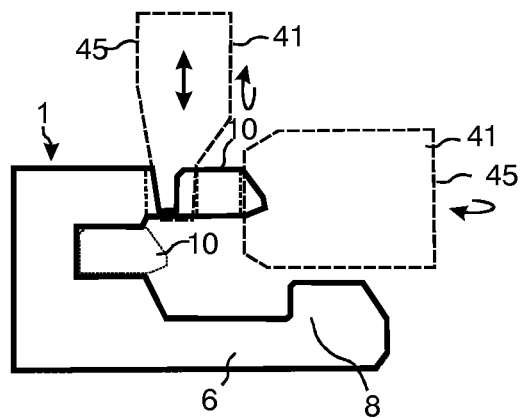
Figure 10C:
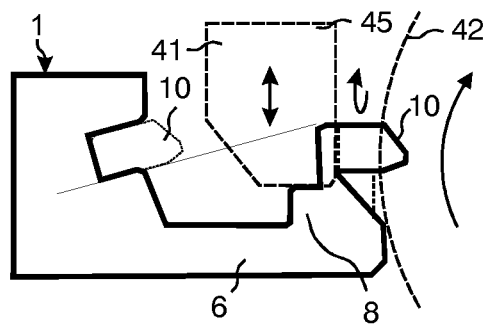

FIG. 10a shows that a curved tongue as shown in FIGS. 8a-8c may for example be formed with a screw cutter 42 and a jumping tool head 41. FIG. 10b shows that a tongue 10 may be formed at an upper part of the edge with jumping tool heads 41. Such an embodiment will save material. FIG. 10c shows that the tongue 10 may be formed above the outer part of the strip 6 with a screw cutter 42 and a jumping tool 41. Jumping tools 41 may in all embodiments of the invention be replaced with rotating carving tools 45.

Figure 11A:
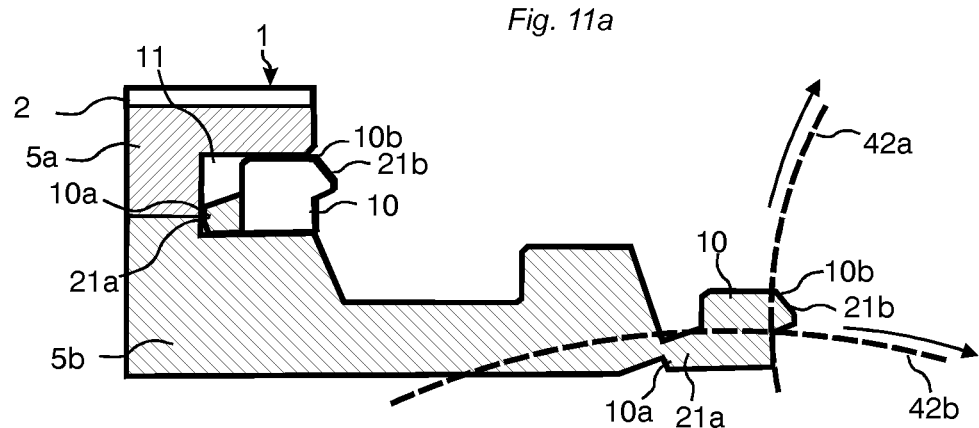
FIGS. 11a-b illustrate forming of a flexible tongue comprising displaced upper and lower parts according to an embodiment.

FIG. 11a shows a panel 1 comprising a surface layer 2 and a core comprising an upper core layer 5a and a lower core layer 5b. In a non-limiting example, the panel 1 may be an LVT panel. The lower core layer 5b comprises a higher content of thermoplastic material than the upper core layer 5a. A flexible tongue 10 is formed from the lower core layer 5b. This means that the flexible tongue 10 comprises the same material composition as the lower core layer 5b. FIG. 11a also shows a flexible tongue 10 that has been inserted into the displacement groove 11.

Figure 11B:
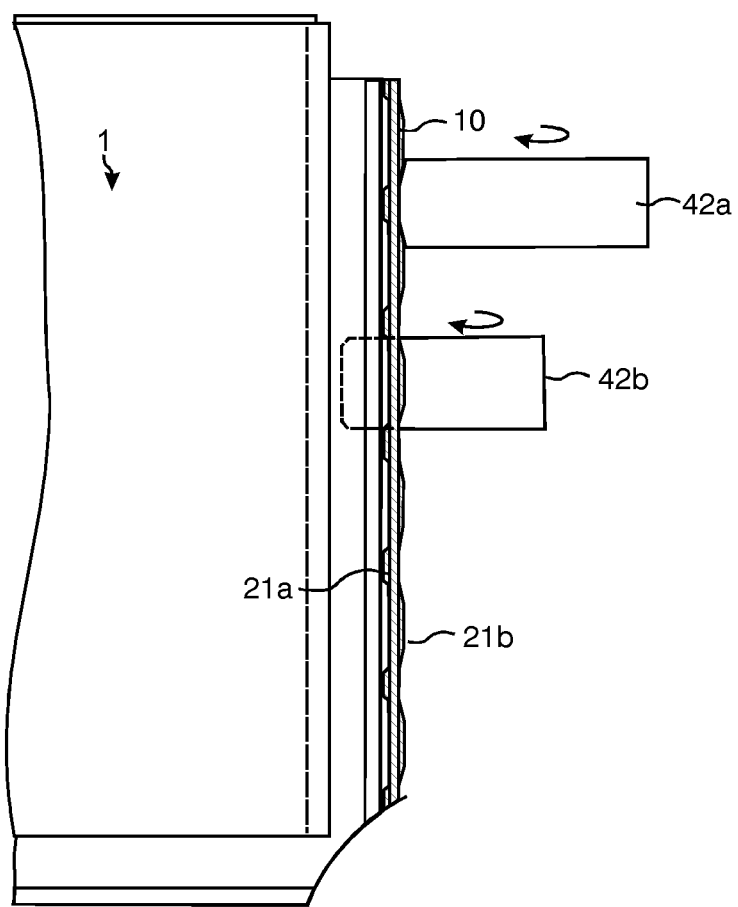

FIGS. 11a and 11b shows that a curved flexible tongue 10 may be formed in a cost efficient way with two screw cutters: a first screw cutter 42a and a second screw cutter 42b. The flexible tongue 10 preferably comprises an inner and lower part 10a and an upper and outer part 10b that are displaced vertically and horizontally in relation to each other. The upper part 10b is preferably more distant to the inner part of the displacement groove 11 than the lower part 10a. An outer protrusion 21b is formed at the upper part 10b when a first screw cutter 42a removes material from the tongue and an inner protrusion 21a is formed at the lower part of the tongue 10a when a second screw cutter 42b removes material from the lower part of the tongue 10a. The inner part of the tongue may also be formed as an upper part and the outer part may also be formed as a lower part. Such tongues may for example be used when the tongue is inserted into an edge of the second panel 1' comprising a locking groove 14.

Figure 12A:
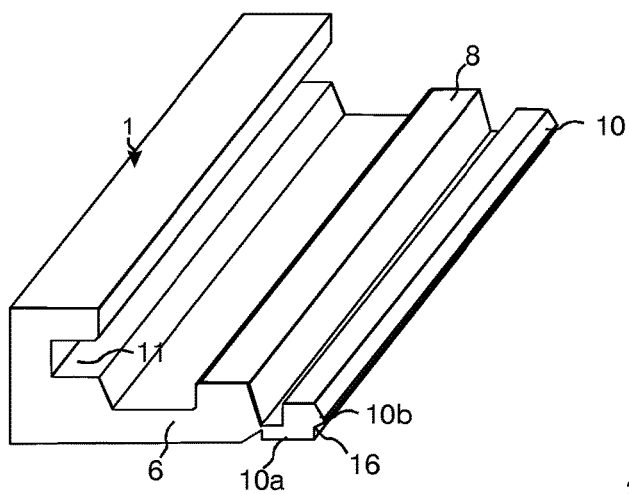
FIGS. 12a-e illustrate forming of a flexible tongue comprising displaced upper and lower parts according to various embodiments.
Figure 12C:
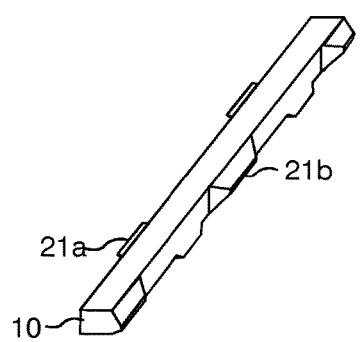
Figure 12B:
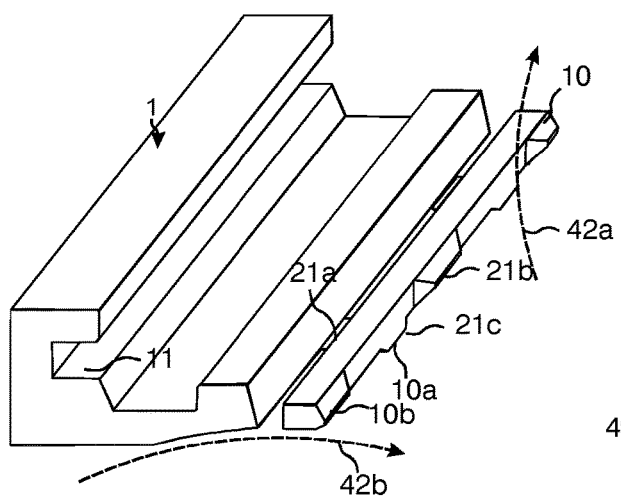

FIGS. 12a-12c provide a more detailed description of the locking system shown in FIGS. 11a, 11b. FIG. 12a shows an edge section of a panel 1 comprising a part of a locking system formed at one of two adjacent panel edges. A groove 11, a strip 6 with a locking element 8 and a tongue 10 is formed with rotating tools. The tongue is preferably formed at an outer part of the strip 6. The locking system and the tongue 10 comprise an essentially identical and continuous cross section along a length direction of the panel edge 1. The tongue 10 comprises upper 10b and lower parts 10a displaced vertically and horizontally in relation to each other. The upper part 10b comprises a locking surface 16. The lower part 10a comprises lower protrusions 21c extending downwards. FIG. 12b shows that a first screw cutter 42a and a second screw cutter 42b may be used to remove material from the outer and upper parts 10b and inner and lower parts 10a of the tongue 10 such that outer protrusions 21b and inner protrusions 21a are formed. FIG. 12c shows a flexible tongue 10 that is released from the strip 6 such that it may be inserted into the displacement groove 11 during production of the locking system. The flexible tongue is characterized in that the inner protrusions 21a are located vertically below the upper part of the tongue 10.

Figure 12E:
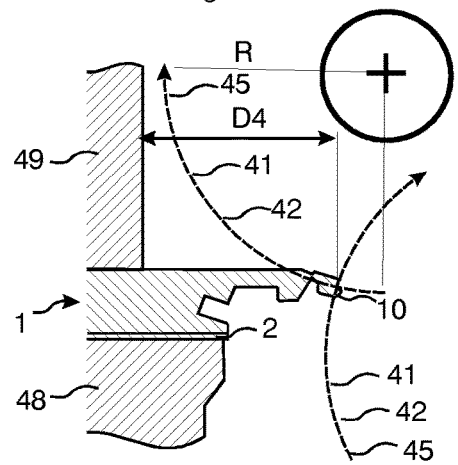
Figure 12D:
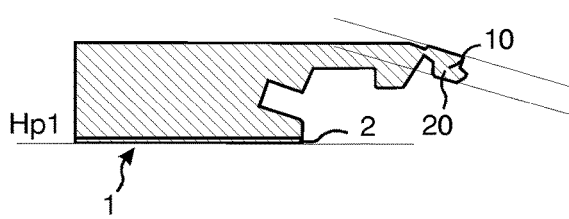

FIGS. 12d and 12e show that the tongue 10 could be formed with a tongue body 20 that is inclined against a horizontal plane Hp1 in order to facilitate an easy machining in a double-end tenor machine comprising a chain 48 and an upper belt 49. The panel 1 is positioned in the double-end tenor with the surface layer 2 pointing downwards. The horizontal distance D4 from the tongue 10 and to the upper belt 49 may be smaller than a radius R of the jumping tool head 41, the screw cutter tool head 45 or of the screw cutter 42.

Figure 13A:
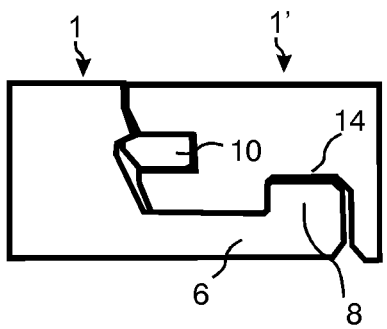
FIGS. 13a-h illustrate various embodiments in accordance with one aspect of the invention.
Figure 13B:
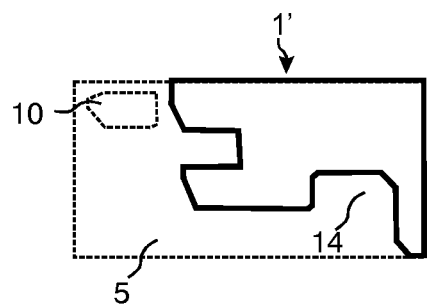
Figure 13C:
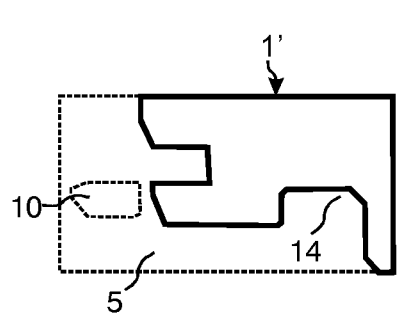
Figure 13D:
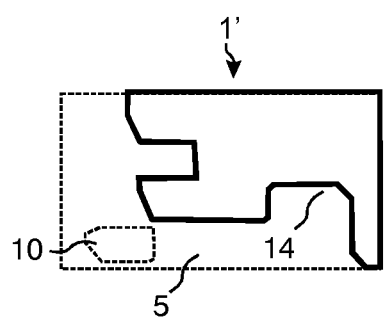
Figure 13E:
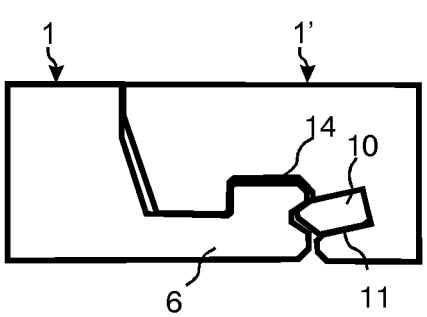
Figure 13F:
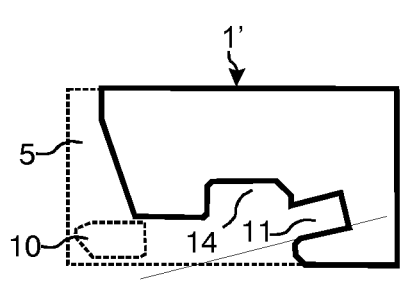
Figure 13G:
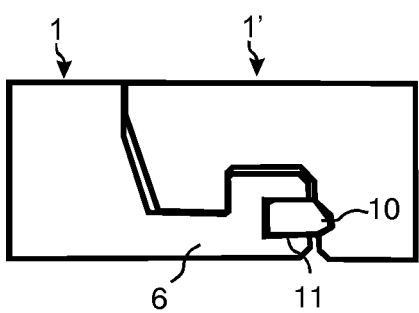
Figure 13H:
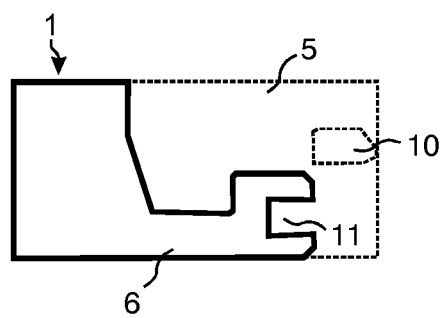

FIGS. 13a-13h show different embodiments. FIG. 13a shows a locking system comprising a flexible tongue 10 on the second panel 1', the fold panel, which comprises a locking groove 14 that cooperates with a locking element 8 formed on a strip 6 of the first panel 1. FIGS. 13b-13d show that the flexible tongue 10 may be formed from a core section of the fold panel 1', which may be located at the upper, middle or lower part of the core 5. FIG. 13e shows a locking system with a flexible tongue 10 attached to a displacement groove 11 formed at an inner wall of the locking groove 14 on the second fold panel 1'. The tongue 10 may be formed from a core section located at a lower part of the core as shown in FIG. 13f. FIG. 13g shows a locking system comprising a displacement groove 11 formed at an outer part of the strip 6 of the first panel 1. FIG. 13h shows that the tongue 10 may be formed from a core portion located above the strip 6.

Figure 14A:
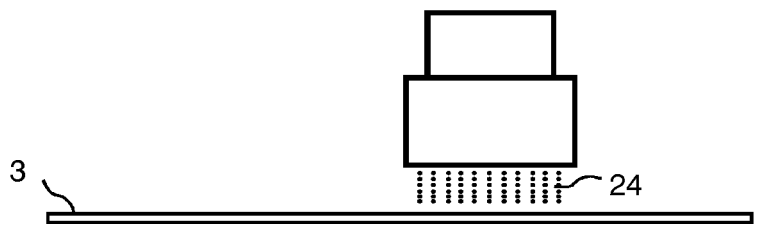
FIGS. 14a-d illustrate a method to reinforce a flexible tongue according to an embodiment.
Figure 14B:
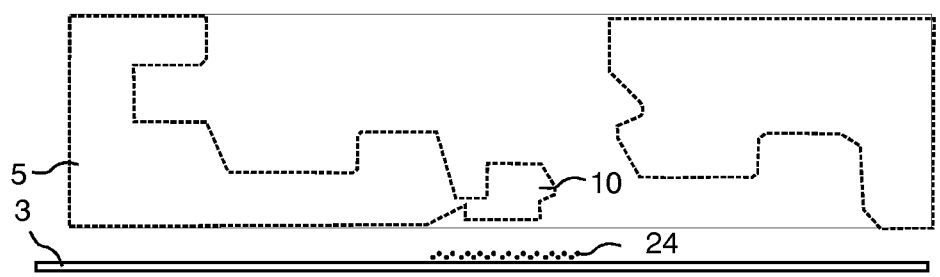
Figure 14C:
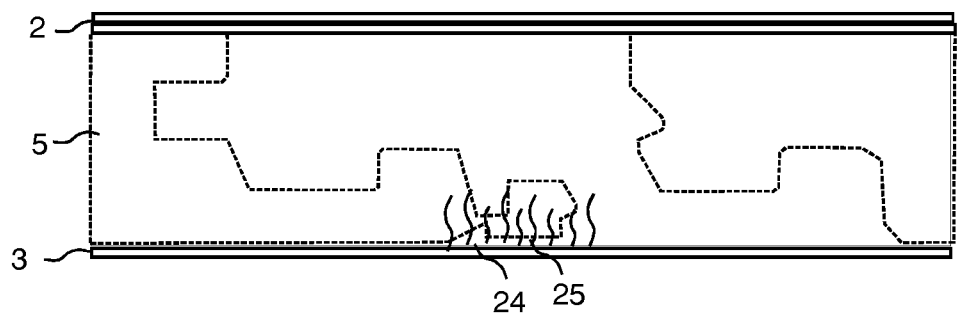
Figure 14D:
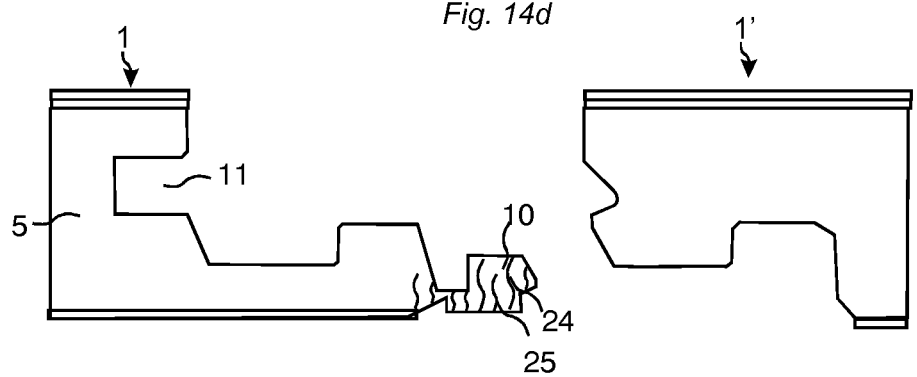

FIGS. 14a-14d show that a core material 5 may be locally modified such that it becomes more suitable to form a flexible tongue 10. The method may be used to increase the strength and flexibility of any kind of mechanical locking systems, even such systems that are formed as one-piece locking systems without a separate flexible tongue. FIG. 14a shows that a resin, for example a thermosetting resin 24, such as for example melamine formaldehyde, urea formaldehyde or phenol formaldehyde resin, may be applied in liquid or dry powder form on for example a melamine formaldehyde impregnated balancing paper 3 or directly on a core material 6. FIG. 14b shows that a core material 5, preferably a wood based panel, for example a HDF board or a particle board, may be applied on the impregnated paper 3 with the added resin 24 prior to lamination. FIG. 14c shows a floor board after lamination when the surface layers 2 and the balancing layer 3 have been laminated to the core 6. The resins 24 have penetrated into the core 5 and cured during lamination under heat and pressure. FIG. 14d shows an edge of a first panel 1 comprising a tongue 10 formed in one piece with the core 5. The tongue 10 is more flexible and comprises a higher resin content than other parts of the core 5. The increased resin content provides a material that is very suitable to form a strong flexible tongue 10 that during production may be inserted into a displacement groove 11.

Figure 15A:
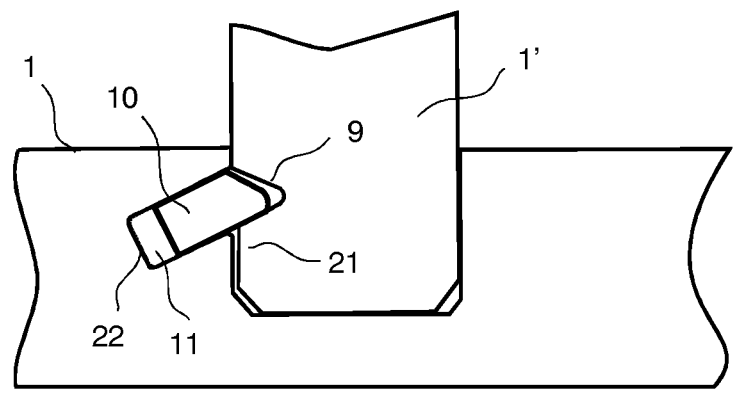
FIGS. 15a-b illustrate locking systems of furniture components and ceramic tiles according to two embodiments.

FIG. 15a shows that a flexible tongue 10 and a locking system according to each embodiment of the disclosure may be used to lock furniture components 1, 1' perpendicularly to each other. Cavities 22 may be formed in an inclined displacement groove 11 and protrusions may be formed below the tongue groove 9. The flexible tongue may be a curved, rod shaped component as described above, and it may also be formed from a core portion of the panel core.

Figure 15B:
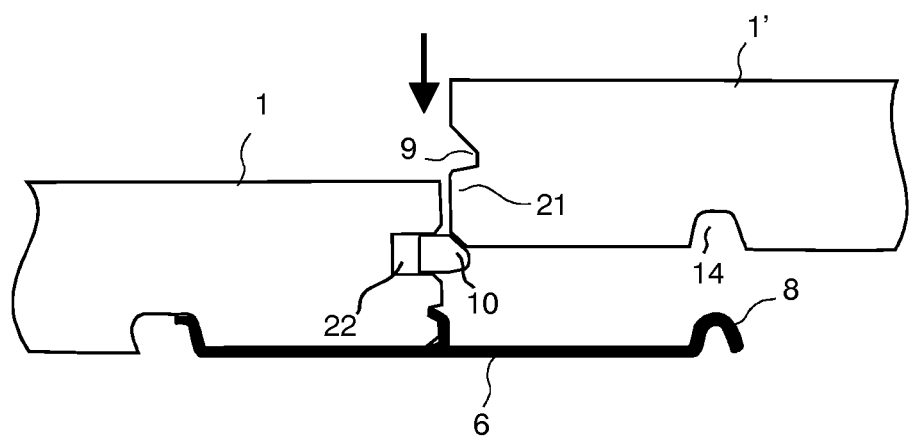

FIG. 15b shows that a flexible tongue 10 and a locking system according to each embodiment of the disclosure may also be used to lock ceramic tiles 1, 1'. The strip 6 and the locking element 8 may be formed as a separate plastic or metal part that is attached to an edge of a first tile 1. Cavities 22 and protrusions 21 may also be formed in ceramic material with diamond tools. All embodiments of the disclosed flexible tongue 10 may be used. A second tile 1' comprises a tongue groove 9 and a locking groove 14. The flexible tongue 10 is configured to cooperate with the tongue groove 9 as described above for locking of the first and the second edge in a vertical direction. Moreover, the locking element 8 of the separate strip 6 is configured to cooperate with the locking groove 14 for locking in the horizontal direction.

All shown locking systems may be adapted such that they may be locked with vertical displacement and/or angling and/ horizontal snapping. They may also be released with upward angling or displacement along the edge. The vertical locking may be combined with a flexible strip 6 and preferably a flexible locking element 8 that is bended during locking. Preferably, the outer part of the strip 6 is bended downwards and the upper part of the locking element 8 is bended or turned horizontally outwardly.

Figure 16A:
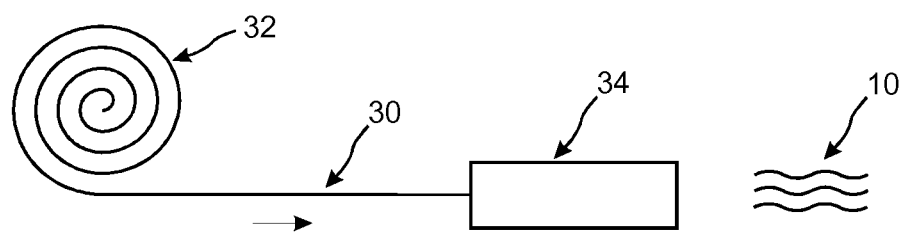
FIGS. 16a-c illustrate forming of a curved flexible tongue according to an embodiment.
Figure 16B:
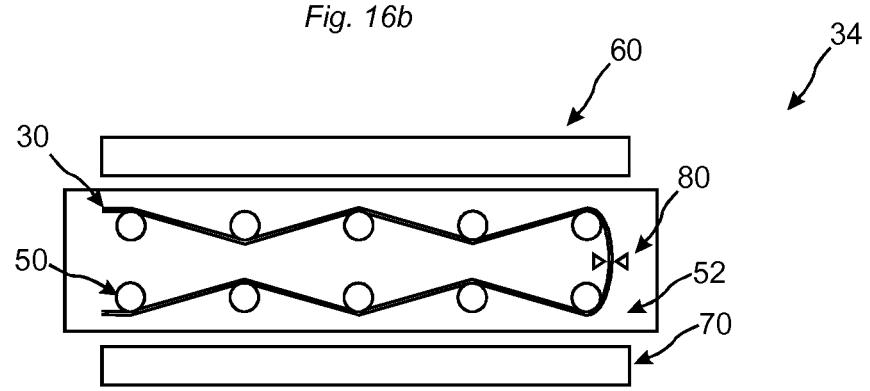
Figure 16C:

As illustrated schematically in FIGS. 16a-c, the curved flexible tongue 10 may be formed by first providing a tongue blank 30, or an essentially straight tongue, and then bend it into a curved flexible tongue of a desired shape by means of deformation. The tongue blank 30 is made of plastic, preferably a thermoplastic material or a thermosetting, with or without reinforcement, as has been described above. However, other materials are equally conceivable. This method is particularly suitable for producing curved flexible tongues having an essentially constant cross-section along the length direction of the tongue. However, the tongue blank 30 may also have a varying cross-section along the length direction of the tongue. Optionally, the tongue blank 30 may comprise inner and/or outer protrusions along its length direction.

As shown in FIG. 16a, the tongue blank 30 is provided on a roll 32 and is fed into a bending device 34 according to a feeding method known to a person skilled in the art. The tongue blank 30 is then arranged in a bent state as shown in FIG. 16b. According to the present embodiment, the tongue blank 30 is arranged in a sequence or matrix of bending elements 50 so that portions of the tongue blank become bent. In FIG. 16b the bending elements 50 are rods, nails or screws that are fixed to a substrate 52 and the tongue blank 30 is arranged in a zig-zag pattern between the bending elements 50. Alternatively, however, the bending elements 50 may be rollers or cylinders. Optionally, the end points of the tongue blank 30 may be fixed, e.g. to the substrate 52. The final shape of the tongue is determined by the pattern of the bending elements 50. The horizontal and/or vertical distances between the bending elements 50 may be constant or, alternatively, varying.

The tongue blank 30 is then fixed in the bent state for a period of time. Optionally, heat may be provided to the tongue blank 30 in a heating process before and/or during the bent state by a heating device 60. Thereby, the forming of the curved tongue may be speeded up. Optionally, the tongue blank may also undergo a cooling process after the heating process by means of a cooling device 70. The heating and cooling process may be implemented by means of methods well known to a person skilled in the art. After a critical period of time has elapsed, the tongue blank 30 assumes a bent shape and becomes deformed permanently, or semi-permanently, and becomes a curved tongue element. The deformation may occur due to tensile forces, compression forces, shear, bending or torsion. A permanent deformation may be a plastic, irreversible, deformation. By semi-permanently is here meant that the bent shape provided directly after forming is essentially preserved at least during a minimum amount of time, such as 1 month, 1 year or 10 years. The curved tongue element is finally cut by a cutting device 80 into one or more curved flexible tongues 10 having predetermined lengths. A curved flexible tongue 10 resulting from the above process is schematically illustrated in FIG. 16c.

It is emphasized that all embodiments disclosed above may be partly or completely combined with each other. In particular, the various choices of materials and reinforcements of the flexible tongue presented in relation to the embodiment in FIGS. 4a-c may also be used in embodiments of the other flexible tongues in the present application—straight or curved.

The invention claimed is:

1. A set of essentially identical floor panels provided with a mechanical locking system comprising a flexible tongue, which is arranged in a displacement groove at a first edge of a first panel, and a tongue groove at a second edge of an adjacent second panel, the flexible tongue is configured to cooperate with the tongue groove for locking of the first and the second edge in a vertical direction, wherein:

the flexible tongue comprises a sliding surface and a locking surface, the displacement groove comprises at least two cavities, each comprising upper, inner and lower cavity walls and a horizontal opening, wherein a portion of the displacement groove provided between said at least two cavities is configured to cooperate with a portion of the flexible tongue during locking, the second floor panel comprises at least two protrusions, each comprising a sliding edge which is configured to cooperate with the sliding surface during locking and to press and bend a flexible tongue section into the at least two cavities, and the flexible tongue section is configured to move back outwardly in a final stage of the locking such that the locking surface is inserted into the tongue groove.

2. The set of floor panels as claimed in claim 1, wherein the mechanical locking system further comprises a locking strip, at the first or the second edge, provided with a locking element configured to cooperate with a locking groove at the other of the first or second edge for locking in a horizontal direction.

3. The set of floor panels as claimed in claim 1, wherein the displacement groove comprises a horizontal opening that is distinct from the horizontal opening of each of the at least two cavities.

4. The set of floor panels as claimed in claim 1, wherein said portion of the displacement groove is an inner wall of the displacement groove.

5. The set of floor panels as claimed in claim 1, wherein said portion of the flexible tongue is an inner portion of the flexible tongue.

6. The set of floor panels as claimed in claim 1, wherein the flexible tongue springs back fully to an original configuration of the flexible tongue after locking.

7. The set of floor panels as claimed in claim 1, wherein the flexible tongue springs back only partly to an original configuration of the flexible tongue after locking.

8. The set of floor panels as claimed in claim 1, wherein each of the inner cavity walls is a curved surface.

9. The set of floor panels as claimed in claim 1, wherein each of the inner cavity walls is a planar surface.

10. The set of floor panels as claimed in claim 1, wherein each of the upper, inner and lower cavity walls starts and ends in the displacement groove along a length direction thereof.

11. The set of floor panels as claimed in claim 1, wherein the flexible tongue has a constant cross-section along a length direction of the flexible tongue.

12. The set of floor panels as claimed in claim 1, wherein each of the at least two cavities has a same vertical extension as the displacement groove.

13. The set of floor panels as claimed in claim 1, wherein each of the at least two cavities has a larger vertical extension than the displacement groove.

14. The set of floor panels as claimed in claim 1, wherein the flexible tongue is straight-rod shaped.

15. A set of essentially identical floor panels provided with a mechanical locking system comprising a flexible tongue, which is arranged in a displacement groove at a first edge of a first panel, and a tongue groove at a second edge of an adjacent second panel, the flexible tongue is configured to cooperate with the tongue groove for locking of the first and the second edge in a vertical direction, wherein:
an outer part of the flexible tongue comprises a protrusion comprising a sliding surface and a locking surface,
the displacement groove comprises at least two cavities, each comprising upper, inner and lower cavity walls and a horizontal opening, wherein a portion of the displacement groove provided between said at least two cavities is configured to cooperate with a portion of the flexible tongue during locking,
the second floor panel comprises a sliding edge which is configured to cooperate with the sliding surface during locking and to press and bend a flexible tongue section into the at least two cavities, and
the flexible tongue section is configured to move back outwardly such that the locking surface is inserted into the tongue groove.

16. The set of floor panels as claimed in claim 15, wherein the mechanical locking system further comprises a locking strip, at the first or the second edge, provided with a locking element configured to cooperate with a locking groove at the other of the first or second edge for locking in a horizontal direction.

17. The set of floor panels as claimed in claim 15, wherein the displacement groove comprises a horizontal opening that is distinct from the horizontal opening of each of the at least two cavities.

18. The set of floor panels as claimed in claim 15, wherein the flexible tongue springs back to an original configuration of the flexible tongue after locking.

19. The set of floor panels as claimed in claim 15, wherein each of the upper, inner and lower cavity walls is a continuous cavity wall.

20. The set of floor panels as claimed in claim 15, wherein the flexible tongue is insertable into the at least two cavities of the displacement groove with the protrusion facing away from the at least two cavities.

* * * * *